(12) United States Patent
Kim et al.

(10) Patent No.: US 9,030,422 B2
(45) Date of Patent: May 12, 2015

(54) METHOD OF TRANSMITTING AND RECEIVING DATA AND DISPLAY DEVICE USING THE SAME

(75) Inventors: Jongcheol Kim, Seoul (KR); Ranganathan Mohan Krishna, Seoul (KR); John Manayil Roshy, Seoul (KR); Jinyung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 541 days.

(21) Appl. No.: 13/396,185

(22) Filed: Feb. 14, 2012

(65) Prior Publication Data

US 2012/0206391 A1 Aug. 16, 2012

Related U.S. Application Data

(60) Provisional application No. 61/442,810, filed on Feb. 15, 2011.

(30) Foreign Application Priority Data

Jul. 18, 2011 (KR) .................. 10-2011-0071105

(51) Int. Cl.
 *G06F 3/041* (2006.01)
 *H04M 1/725* (2006.01)
 *G06F 3/0488* (2013.01)
(52) U.S. Cl.
 CPC ......... *H04M 1/7253* (2013.01); *G06F 3/04883* (2013.01); *G06F 3/04886* (2013.01)
(58) Field of Classification Search
 USPC ............. 345/1.3, 3.1, 520; 715/717; 455/3.06
 See application file for complete search history.

(56) References Cited

U.S. PATENT DOCUMENTS

| 8,280,413 B2* | 10/2012 | Choi et al. ............... 455/457 |
| 2008/0256471 A1 | 10/2008 | Okamoto |
| 2009/0132923 A1* | 5/2009 | Han et al. ............... 715/717 |
| 2009/0309846 A1 | 12/2009 | Trachtenberg |
| 2010/0107219 A1 | 4/2010 | Thompson et al. |
| 2010/0313143 A1 | 12/2010 | Jung et al. |

FOREIGN PATENT DOCUMENTS

| KR | 10-2006-0082168 A | 7/2006 |
| KR | 10-2009-0084634 A | 8/2009 |
| KR | 10-2010-0109686 A | 10/2010 |

OTHER PUBLICATIONS

Korean Office Action dated Oct. 29, 2012 for Application No. 10-2011-0061963 with English Translation,10 pages.
European Search Report dated Jul. 16, 2012 for Application No. EP12000983, 10 pages.

(Continued)

*Primary Examiner* — Abbas Abdulselam
(74) *Attorney, Agent, or Firm* — Fish & Richardson P.C.

(57) ABSTRACT

A method of transmitting and receiving data between a mobile terminal and a display device is provided. The method establishes network connection for communication with the mobile terminal, detects a touch location of the mobile terminal when the mobile terminal touches the display device, designates a first region corresponding to the touch location to the mobile terminal when the touch of the mobile terminal is ended, and transmits data corresponding to an object to the mobile terminal when the object displayed on a screen moves to the designated first region.

19 Claims, 33 Drawing Sheets

(56) References Cited

OTHER PUBLICATIONS

Eunma: "Amnesia Razorfish Announces Gesture Sharing for Smartphones and Tablets using Microsoft Surface (Press Release)", Jan. 26, 2011, pp. 1-2. XP055027720; URL:http://surflightroy.net/2011/01/26/amnesia-razorfish-announces-gesture-sharing-for-smartphones-and-tablets-using-microsoft-surface-press-release-by-eunma/.

Steve Hodges et al: "ThinSight: Versatile Multi-touch Sensing for Thin Form-Factor Display"; Oct. 7, 2007, pp. 259-268; XP007905450.

Chinese Office Action and Search Report dated Dec. 4, 2013 for Application No. 201210033131.0, with English Translation, 13 pages.

Steve Hodges et al.; "ThinSight: Versatile Multi-touch Sensing for Thin Form-factor Displays", Microsoft Research Cambridge, Cambridge, CB3 0FB, 10 pages, Oct. 2007.

Amnesia Connect: Gesture Sharing for Smartphones and Tablets using Microsoft Surface [Video], Posted by Haseeb on Jan. 28, 2011, 1 page.

* cited by examiner (a)     (b)

FIG.7
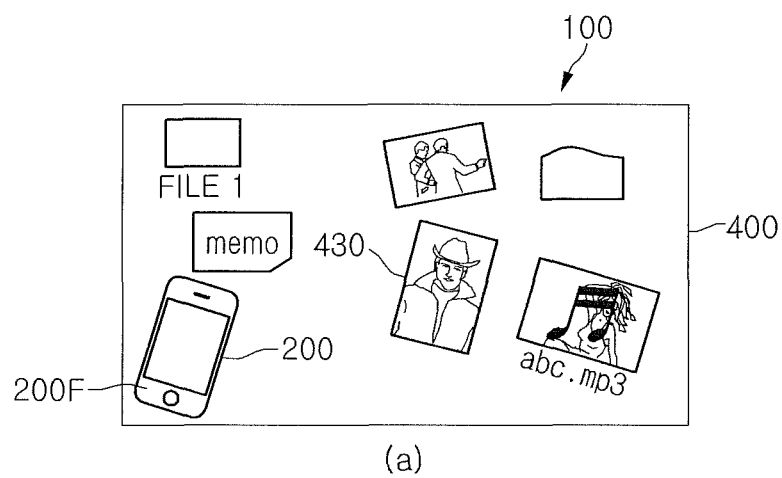
(a)
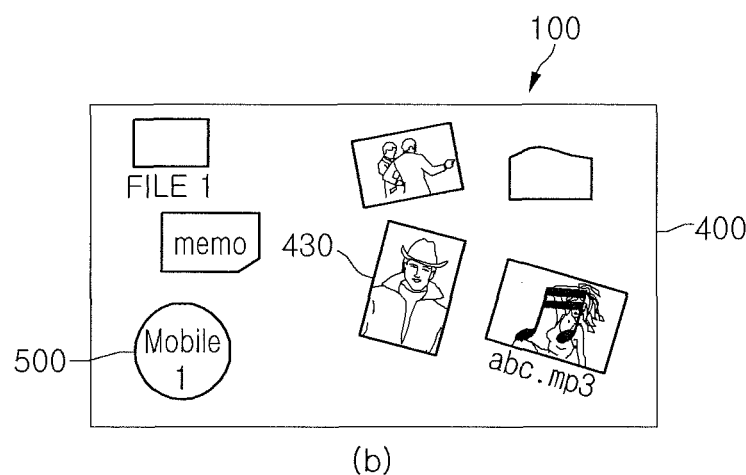
(b)

FIG.8
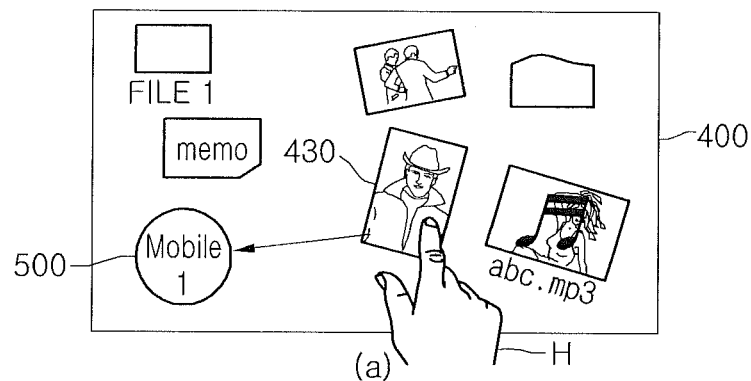
(a)
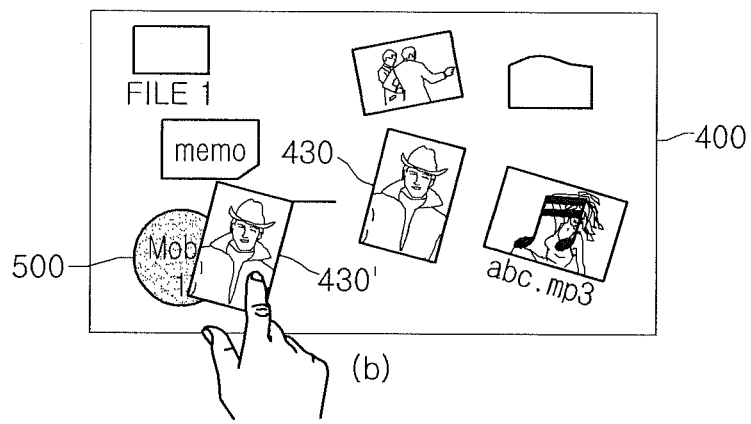
(b)
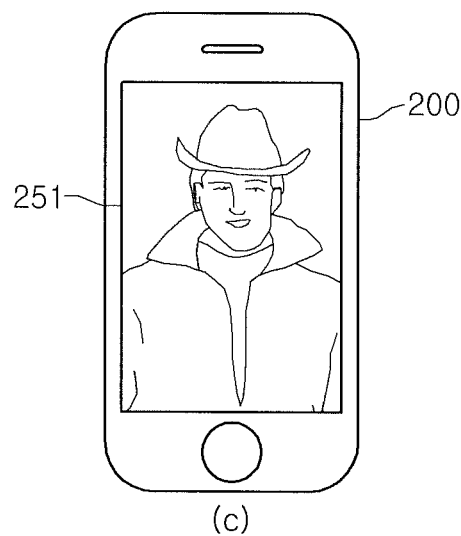
(c)

FIG.12
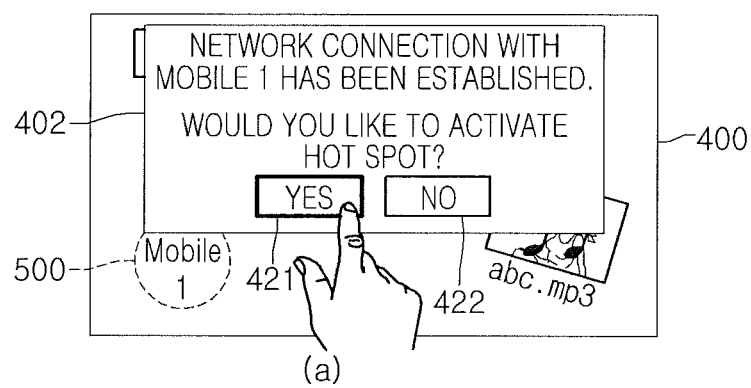
(a)
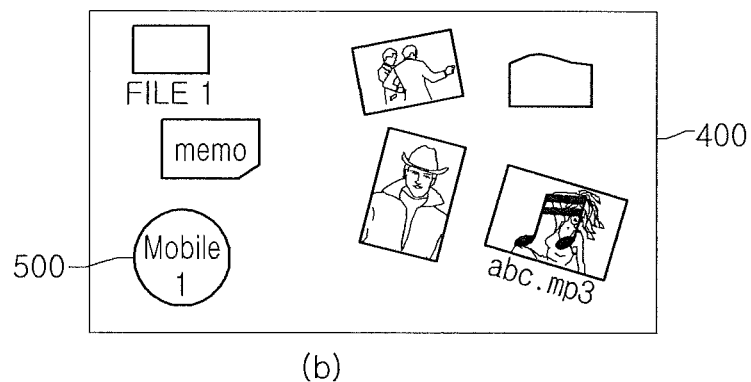
(b)

FIG.13
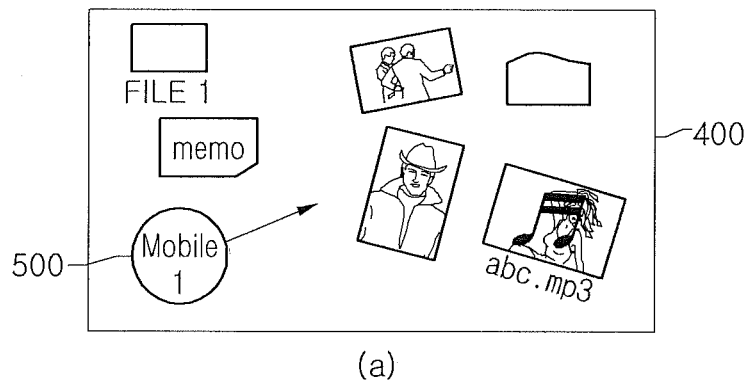
(a)
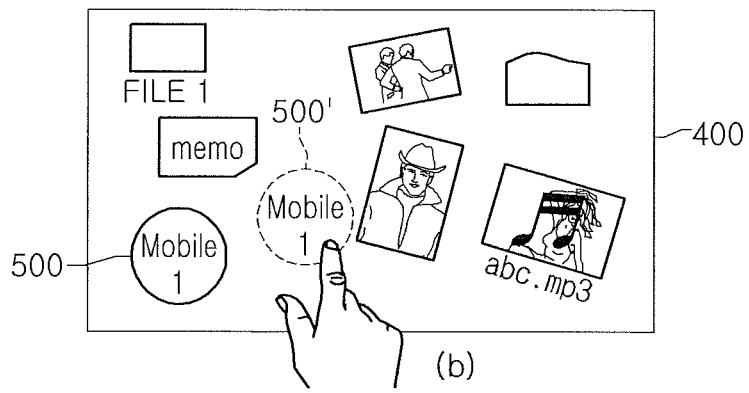
(b)
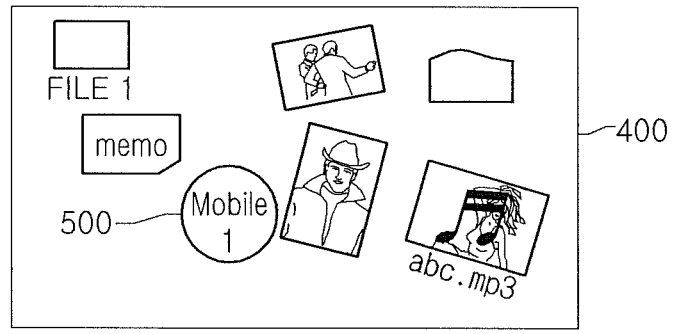
(c)

FIG.14
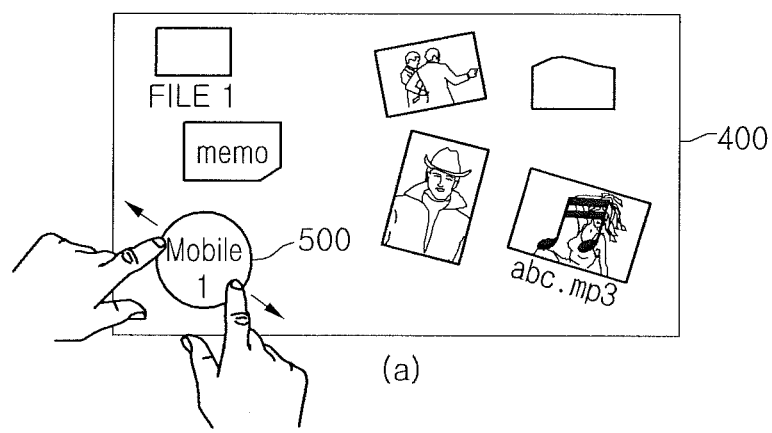
(a)
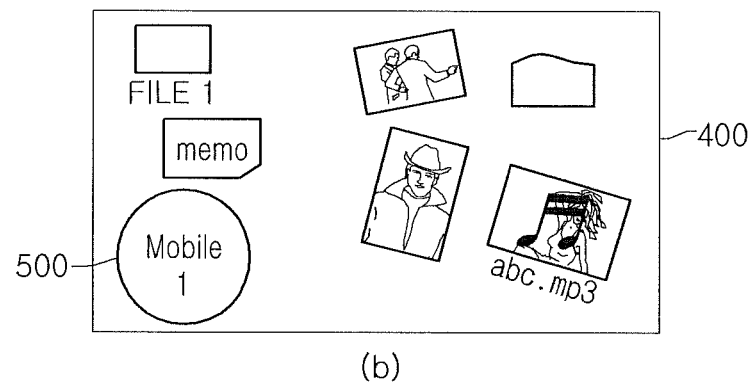
(b)

FIG.15
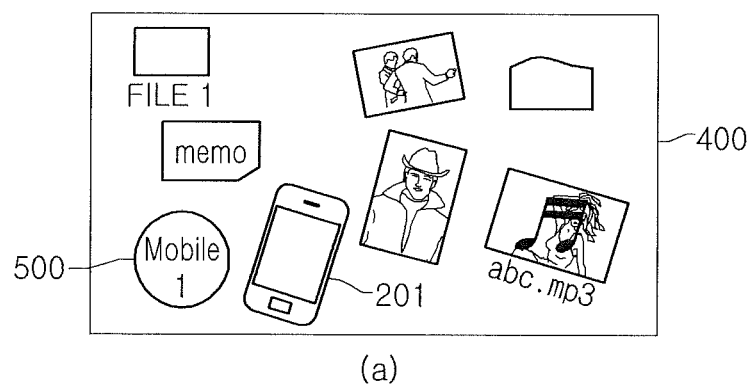
(a)
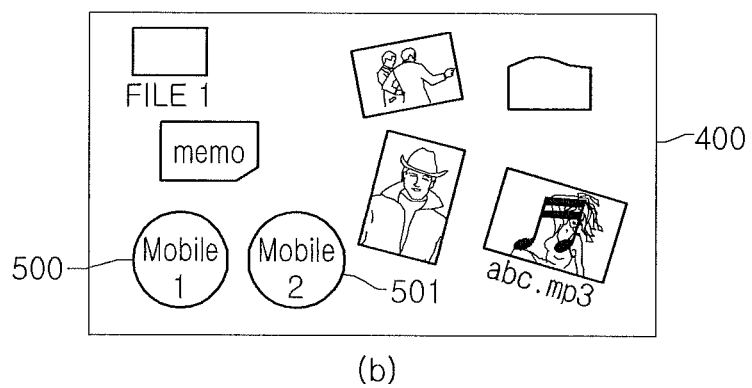
(b)

FIG.16
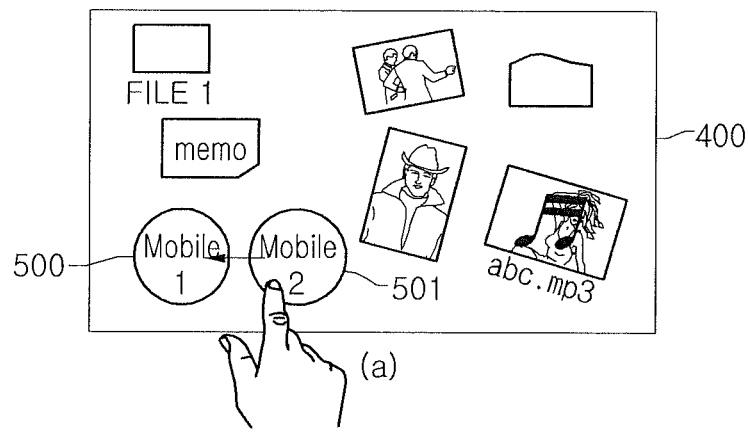
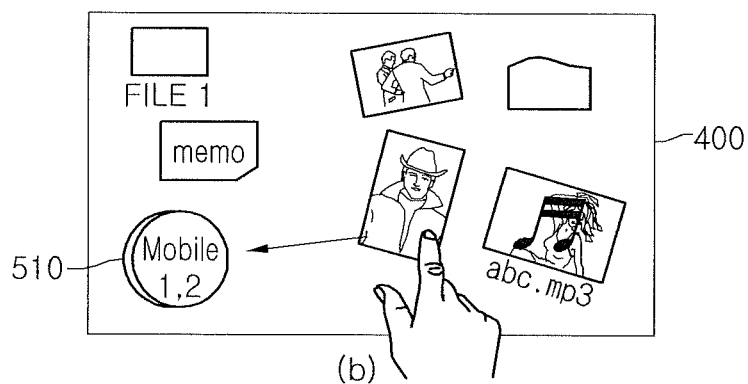
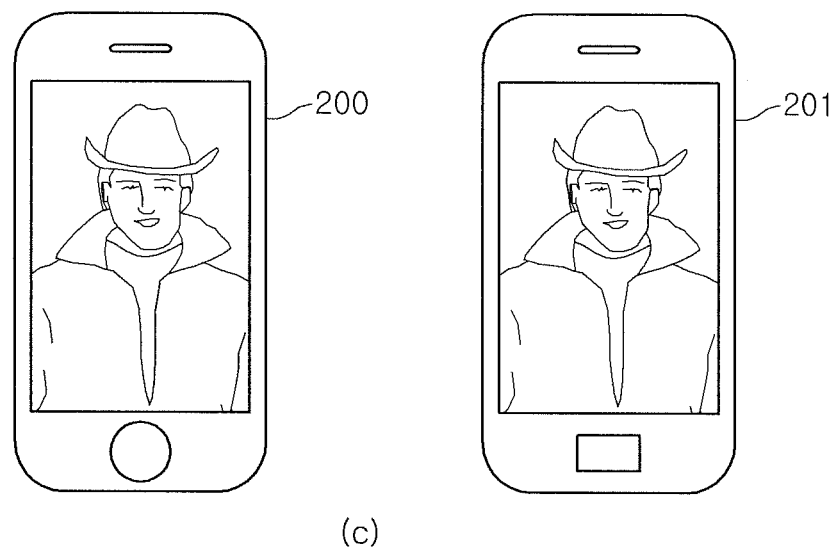

FIG.19
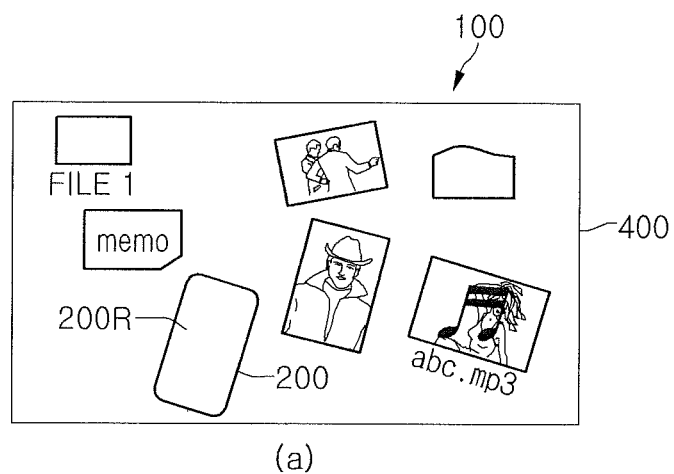
(a)
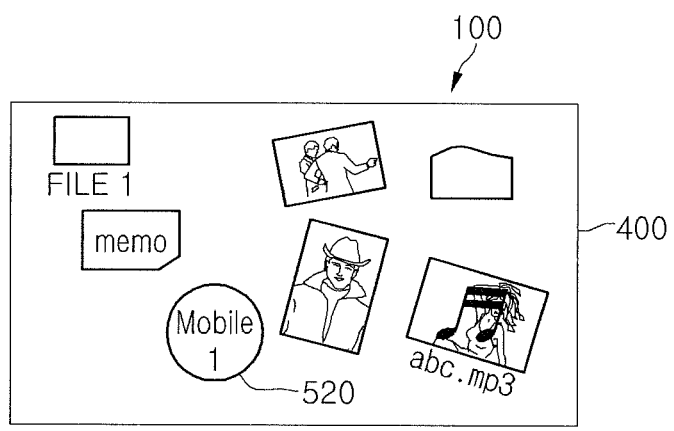
(b)

FIG.20
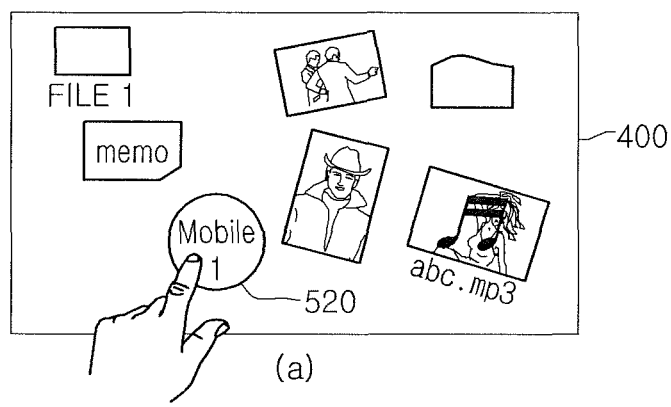
(a)
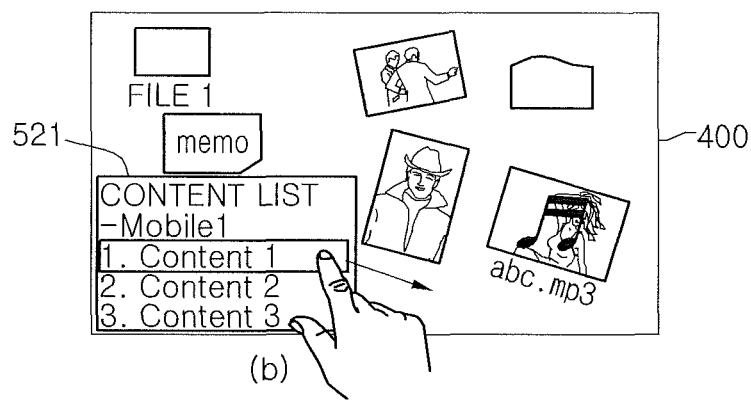
(b)
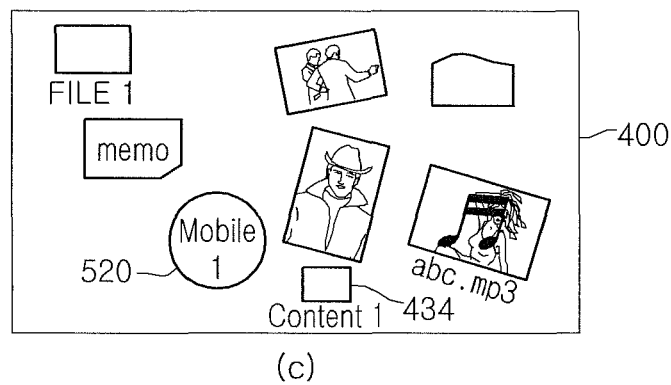
(c)

FIG.23
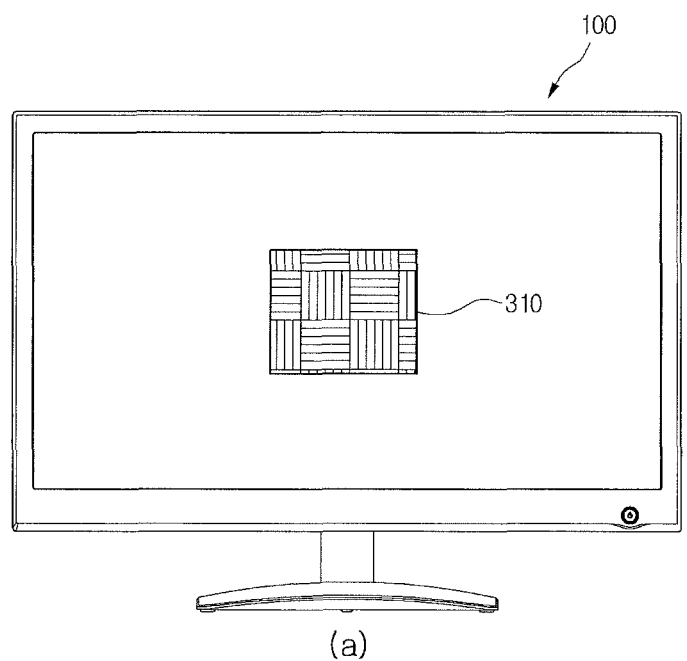
(a)
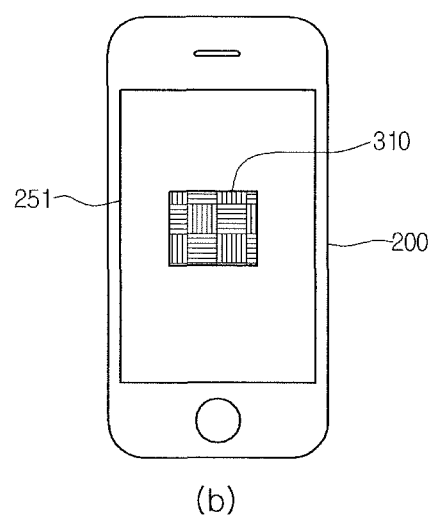
(b)

METHOD OF TRANSMITTING AND RECEIVING DATA AND DISPLAY DEVICE USING THE SAME

CROSS-REFERENCE TO RELATED APPLICATIONS

The present application claims priority under 35 U.S.C. 119 and 35 U.S.C. 365 to U.S. Provisional Application No. 61/442,810 (filed on 15 Feb. 2011) and Korean Patent Application No. 10-2011-0071105 (filed on 18 Jul. 2011), which are hereby incorporated by reference in their entirety.

BACKGROUND

The present disclosure relates to a method of transmitting and receiving data between a display device and a mobile terminal.

Mobile terminals are portable devices that are capable of being carried by a user and are configured to perform at least one of the following functions: a function of performing voice call and/or video call; a function of inputting/outputting information; and/or a function of storing data.

As the functions of mobile terminals are further diversified, the mobile terminals progressively have a plurality of complicated functions such as a function of capturing a picture or a moving image, a function of replaying a music file or a video file, a function of playing a game, a function of receiving broadcast, a function of accessing wireless Internet, etc. That is, the mobile terminals are realized as multimedia players.

SUMMARY

Embodiments provide a user interface which can efficiently control data communication between a display device and a mobile terminal.

One innovative aspect of the subject matter described in this specification is embodied in methods that include the actions of: establishing a communication connection with a mobile terminal; detecting a touch location on a display surface of the display device at which the mobile terminal touches the display device; designating, at an area of the display surface of the display device, a first region corresponding to the touch location; determining that an object displayed on the display surface of the display device is moved into the designated first region; and transmitting data, corresponding to the object, to the mobile terminal based on the determination that the object is moved into the designated first region.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, detecting a touch location on a display surface of the display device at which the mobile terminal touches the display device may include detecting that the mobile terminal touches the display device for at least a threshold amount of time.

Additionally or alternatively, detecting a touch location on a display surface of the display device at which the mobile terminal touches the display device may include detecting that the mobile terminal touches a region of the display surface of the display device where no object is displayed. Moreover, designating a first region, corresponding to the touch location, to the mobile terminal on the display surface of the display device may include designating, based on detecting that the mobile terminal touches a region of the screen of the display device where no object is displayed, a first region, corresponding to the touch location, to the mobile terminal on the display surface of the display device, and not designating an area of the display surface as the first region corresponding to the touch location when detecting that the mobile terminal touches a region of the screen of the display device where an object is displayed.

Additionally or alternatively, the method may further include storing a location of the designated first region and identification information of the mobile terminal in association with each other. Also, the method may further include displaying a graphical representation corresponding to the mobile terminal in the first region on the display surface of the display device.

Additionally or alternatively, the method may further include detecting that the communication connection between the mobile terminal and the display device is ended, and removing, based on detecting that the communication connection between the mobile terminal and the display device is ended, the graphical representation of the mobile terminal from the display surface of the display device.

Additionally or alternatively, the method may further include determining whether the communication connection between the mobile terminal and the display device is active or inactive. Moreover, displaying a graphical representation of the mobile terminal in the first region on the display surface of the display device may include displaying a first graphical representation of the mobile terminal when it is determined that the communication connection between the mobile terminal and the display device is active and displaying a second graphical representation of the mobile terminal when it is determined that the communication connection between the mobile terminal and the display device is inactive.

Additionally or alternatively, the method may further include receiving a user input corresponding to a command to change a size of the displayed first region, and updating, based on the received user input, the display of the graphical representation to change the size of the displayed first region.

Additionally or alternatively, the method may further include: detecting a touch location on a display surface of the display device at which a second mobile terminal touches the display device; designating, at an area of the display surface of the display device, a second region corresponding to the touch location of the second mobile terminal; determining that a second object displayed on the display surface of the display device is moved into the designated second region; and transmitting data, corresponding to the second object, to the second mobile terminal based on the determination that the second object is moved into the designated second region.

Additionally or alternatively, the method may further include determining that the first and second regions at least partially overlap with each other; determining that a third object displayed on the display surface of the display device is moved into an area of overlap between the first region and the second region; transmitting data corresponding to the third object to the first and second mobile terminals based on the determination that the third object is moved into the area of overlap between the first region and the second region.

Additionally or alternatively, the detecting the touch location on the display surface of the display device at which the mobile terminal touches the display device may include detecting the touch location on the display surface of the display device at which the mobile terminal physically contacts the display device.

Additionally or alternatively, the method may further include determining that a rear of the mobile terminal is touching the display device, wherein detecting touch location on a display surface of the display device at which the mobile terminal touches the display device includes detecting a location at which the rear of the mobile terminal touches the display device, the rear of the mobile terminal being the side of the mobile terminal opposite a display interface of the mobile terminal.

Additionally or alternatively, the method may include determining that a front of the mobile terminal is touching the display device, the front of the mobile terminal being the side of the mobile terminal corresponding to a display interface of the mobile terminal, wherein detecting touch location on a display surface of the display device at which the mobile terminal touches the display device includes detecting a location at which the rear of the mobile terminal touches the display device; and receiving, by utilizing the designated first region, data from the mobile terminal.

Additionally or alternatively, the method may include detecting a touch location on a display surface of the display device at which the mobile terminal touches the display device includes determining the touch location on the display surface of the display device at which the mobile terminal touches the display device by using at least one of a touch sensor, an Near Field Communication (NFC) tag, or a catadioptric camera included in the display device.

Another innovative aspect of the subject matter described in this specification is embodied in a display device that includes: a display unit configured to display a plurality of objects on a screen; a control unit; and a communication interface. The control unit is configured to perform any combination of the following operations: detect a touch location on a display surface of the display device at which a mobile terminal touches the display device; designate, at an area of the display surface of the display device, a first region corresponding to the touch location; and determine that an object displayed on the display surface of the display device is moved into the designated first region. The communication interface is configured to establish a communication connection with the mobile terminal and transmit data, corresponding to the object, to the mobile terminal based on the determination that the object is moved into the designated first region.

The details of one or more implementations are set forth in the accompanying drawings and the description below. Other features will be apparent from the description and drawings, and from the claims.

BRIEF DESCRIPTION OF THE DRAWINGS

FIG. 7 is a view illustrating a first a method for designating a specific region of a screen of a display device to a mobile terminal according to a touch location of the mobile terminal.
FIG. 8 is a view illustrating a first a method for transmitting and receiving data by using a region designated to a mobile terminal.
FIGS. 10 to 12 are views illustrating a method for managing a region designated to a mobile terminal according to a network connection state.
FIG. 13 is a view illustrating a method for moving a region designated to a mobile terminal according to a user input.
FIG. 14 is a view illustrating a method for adjusting the size of a region designated to a mobile terminal according to a user input.
FIGS. 15 to 18 are views illustrating a method for designating regions of a screen of a display device to mobile terminals to transmit and receive data.
FIG. 19 is a view illustrating a second method for designating a specific region of a screen of a display device to a mobile terminal according to a touch location of the mobile terminal.
FIG. 20 is a view illustrating a second method for transmitting and receiving data by using a region designated to a mobile terminal.
FIGS. 22 to 30 are views illustrating a first configuration of a mobile terminal and a display device that perform a method of transmitting and receiving data.

DETAILED DESCRIPTION OF THE EMBODIMENTS

Hereinafter, a method of transmitting and receiving data and a display device and a mobile terminal using the same will be described in detail with reference to the accompanying drawings.

Figure 1:
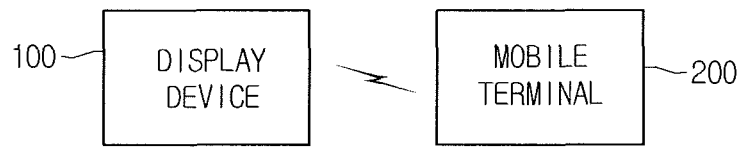
FIG. 1 is a block diagram illustrating a configuration of a system for transmitting and receiving data.

FIG. 1 is a block diagram illustrating a configuration of a system for transmitting and receiving data. The system for transmitting and receiving data may include a display device 100 and a mobile terminal 200.

Referring to FIG. 1, the display device 100 may be an image display device such as a television (TV), a monitor, a notebook computer, or a tablet Personal Computer (PC) that may be connected to the mobile terminal 200 over a wireless network.

For example, the display device 100 may be a network TV, an Internet Protocol TV (IPTV), a Hybrid Broadcast Broadband TV (HBBTV), or a smart TV that may perform various user-friendly functions as various applications are freely added or deleted to/from a general Operating System (OS) Kernel.

The mobile terminal 200 is a device that may be connected to the display device 100 to transmit/receive data over a wireless network. The mobile terminal 200 may have a screen portion smaller than that of the display device 100, and thus may be a device that is capable of carried and freely moved by a user due to its small size and light weight.

For example, the mobile terminal 200 may be one of various devices, which may output an image and sound, such as portable phones, smart phones, tablet PCs, digital broadcasting terminals, Personal Digital Assistants (PDAs), Portable Multimedia Players (PMPs), Internet phones such as SoIP, navigation devices, and MP3 players.

The display device 100 and the mobile terminal 200 may be connected to each other to transmit/receive data in one of various wireless communication schemes such as Wireless LAN (WiFi), WiFi direct, WiFi display, Blutooth, ZigBee, binary Code Division Multiple Access (CDMA), Wireless broadband (Wibro), World Interoperability for Microwave Access (Wimax), High Speed Downlink Packet Access (HSDPA), Universal Plug and Play (UPnP)/Digital Living Network Alliance (DLBNA), Ultra wide band (UWB)/wireless Universal Serial Bus (USB).

The display device 100 and the mobile terminal 200 may share content by respectively transmitting/receiving their stored data in the above-described wireless communication scheme.

The content may be a real-time broadcast, a movie, music, a photograph, a document file, Content On Demand (COD), a game, news, a video call, an application, or the like.

A communication scheme between the display device 100 and the mobile terminal 200 for sharing the content may use various wireless networks enabling data communication, and thus is not limited to a specific communication scheme.

In some implementations, as the mobile terminal 200 touches the display device 100, the mobile terminal 200 and the display device 100 may transmit/receive data to share content.

For example, when a user touches the mobile terminal 200 to a screen portion of the display device 100, a first region of the screen portion of the display device 100 corresponding to a touch location of the mobile terminal 200 is designated to the mobile terminal 200, and thus, data may be transmitted and received between the display device 100 and the mobile terminal 200 through interaction with the designated first region.

Hereinafter, specific configurations of each of the display device 100 and the mobile terminal 200 will be described in detail, with reference to FIGS. 2 and 3.

Figure 2:
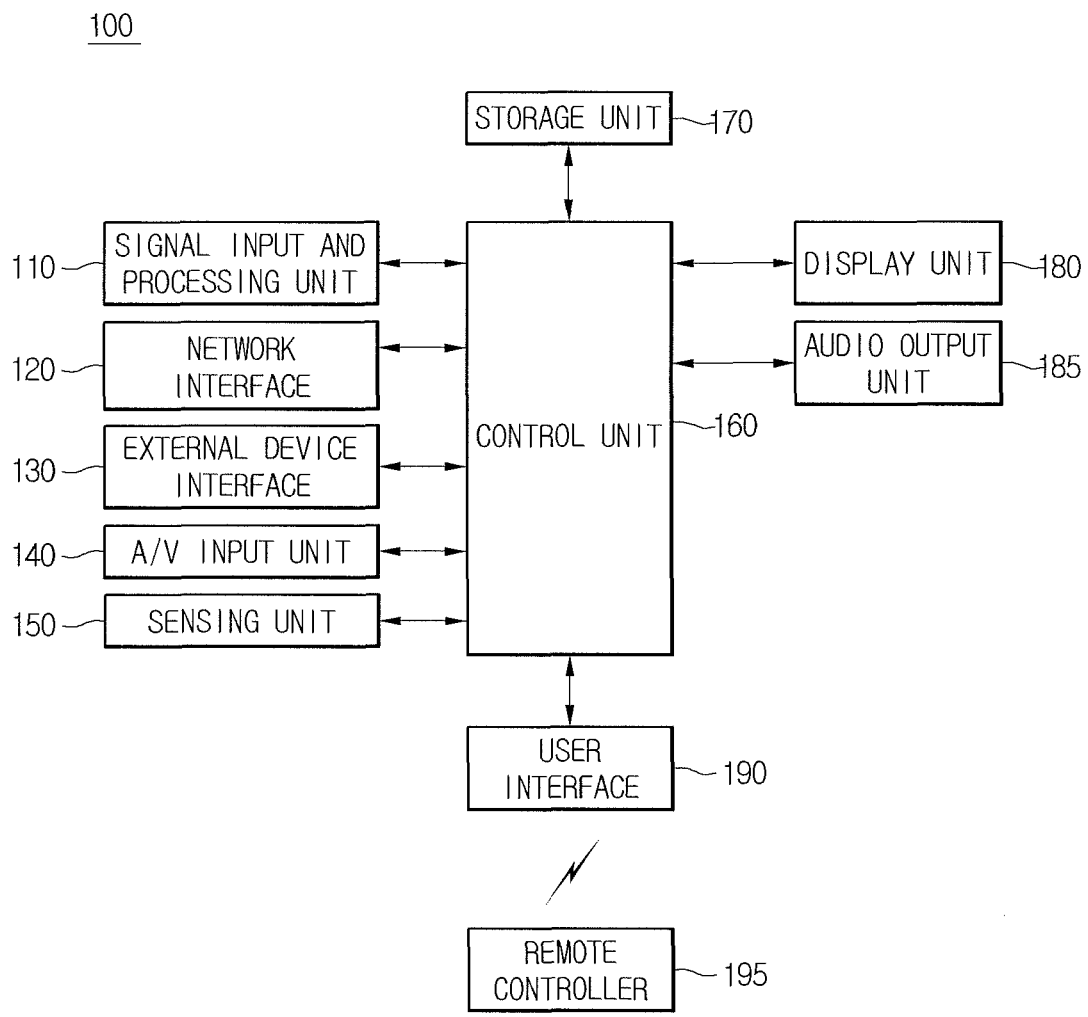
FIG. 2 is a block diagram illustrating a configuration of a display device.

Referring to FIG. 2, the display device 100 may include a signal input and processing unit 110, a network interface 120, an external device interface 130, an A/V input unit 140, a sensing unit 150, a control unit 160, a storage unit 170, a display unit 180, an audio output unit 185, and a user interface 190.

The signal input and processing unit 110 receives and processes a signal from external to the device. For example, the signal input and processing unit 110 may select a Radio Frequency (RF) broadcast signal, corresponding to a channel selected by the user or all pre-stored channels, from among a plurality of RF broadcast signals received through an antenna.

The network interface 120 may provide an interface for connecting the display device 100 to a wired/wireless network, and transmit/receive data to/from an external device in various wireless communication schemes that have been described above with reference to FIG. 1.

For example, the network interface 120 may establish wireless network connection with the mobile terminal 200 according to a communication standard such as WiFi or Bluetooth, and transmit/receive content data and information for data communication to/from the mobile terminal 200 over the connected network.

Moreover, the network interface 120 may include an Ethernet terminal for accessing the Internet. For example, the network interface 120 may access a webpage through the Ethernet terminal to receive content provided from a specific content provider or a network provider, such as a movie, an advertisement, a game, VOD, a broadcast signal, or the like.

The external device interface 130 may establish a connection between an external device and the display unit 180. For example, the external device interface 130 may access an external device such as a Digital Versatile Disk (DVD), Blu-ray, a game machine, a camera, a camcorder, or a computer (e.g., a notebook computer) in a wireless way or a wired way.

In order for the display unit 180 to receive a video signal and an audio signal from an external device, the A/V input unit 140 may include a Composite Video Banking Sync (CVBS) terminal, a component terminal, an S-video terminal (analog), a Digital Visual Interface (DVI) terminal, a High Definition Multimedia Interface (HDMI) terminal, RGB terminals, and/or a D-SUB terminal.

The A/V input unit 140 may include a camera or a microphone and acquire data corresponding to an image or voice of a user, and the acquired data may be delivered to the control unit 160.

The sensing unit 150 may include various sensors such as a touch sensor, a magnetometer, an accelerometer, a proximity sensor, a gyroscope sensor, an ambient light sensor, a colorimeter, and/or a tag, for sensing the current state of the display device 100.

For example, the control unit 160 may sense the touch of the mobile terminal 200 for transmission/reception of data or detect a location/orientation where the mobile terminal 200 touches the display device 100 by using the measured value of a sensor included in the sensing unit 150

The control unit 160 controls an overall operation of the display device 100. The control unit 160 may demultiplex a data stream that is inputted through the signal input and processing unit 110, the network interface 120, or the external device interface 130, and process the demultiplexed signals, thereby generating and outputting a signal for output of video or audio.

The storage unit 170 may store a program that may be utilized in the signal processing and control of the control unit 160. In addition, the storage unit 170 may store the signal-processed video, audio, or data signal.

Moreover, the storage unit 170 may temporarily store a video, audio, or data signal that is inputted from the external device interface 130 or the network interface 120, or store information regarding a predetermined broadcast channel with a channel storage function.

The storage unit 170 may store an application or an application list that is inputted from the external device interface 130 or the network interface 120.

The storage unit 170, for example, may include at least one storage medium of a flash memory, a hard disk, a micro MultiMediaCard (MMC) type of memory, a card type of memory (e.g., an SD or XD memory, etc.), a Random Access Memory (RAM), and a Read Only Memory (ROM, for example, Electrically Erasable and Programmable Read Only Memory (EEPROM), etc.).

The display device 100 may provide content data (e.g., a moving image file, a still image file, a music file, a document file, an application file, or the like) stored in the storage unit 170 to a user by displaying the content data.

The user interface 190 delivers, to the user, a signal inputted by the user to the control unit 160, or delivers a signal inputted from the control unit 160.

For example, the user interface 190 may receive a control signal or a user input signal such as power-on/off, selection of a channel, or setting of a screen from a remote controller 195 in one of various communication schemes such as Bluetooth, Radio Frequency Identification (RFID), Infrared Data Association (IrDA), Ultra Wideband (UWB), Zigbee, and Digital Living Network Alliance (DLNA) and process the received signal. Alternatively, the user interface 190 may process the control signal from the control unit 160 in order for the control signal to be transmitted to the remote controller 195.

The control unit 160 may control the display unit 180 so as to display an image. For example, the control unit 160 may perform control such that the display unit 180 displays a broadcast image inputted through the signal input and processing unit 110, an external input image inputted through the external device interface 130, an image inputted through the network interface 120, or an image stored in the storage unit 170. An image displayed by the display unit 180 may be a still image or a moving image, and be a Two-Dimensional (2D) image or a Three-Dimensional (3D) image.

The display unit 180 may include a screen portion positioned such that it is exposed to a surface of the display device 100 for displaying an image.

The display unit 180 converts an image signal, a data signal, and an On Screen Display (OSD) signal that have been processed by the control unit 160 into RGB signals to generate a driving signal. Alternatively, the display unit 180 converts an image signal and a data signal, which are received through the external device interface 130, into RGB signals to generate a driving signal.

The display unit 180 may display an image utilizing one of various display types such as Plasma Display Panel (PDP), Liquid Crystal Display (LCD), Organic Light Emitting Diode (OLED), flexible display, and 3D display. The display unit 180 may be configured with a touch screen and used as an input device as well as an output device.

The audio output unit 185 receives a signal (e.g., a stereo signal, a 3.1 channel signal or a 5.1 channel signal) audio-processed by the control unit 160 to output audio.

The configuration of the display device according to one implementation has been described above with reference to FIG. 2, but the present invention is not limited thereto. As another example, the elements of FIG. 2 may be partially integrated or omitted, or other elements may be added, according to the main function or specification of a display device.

Figure 3:
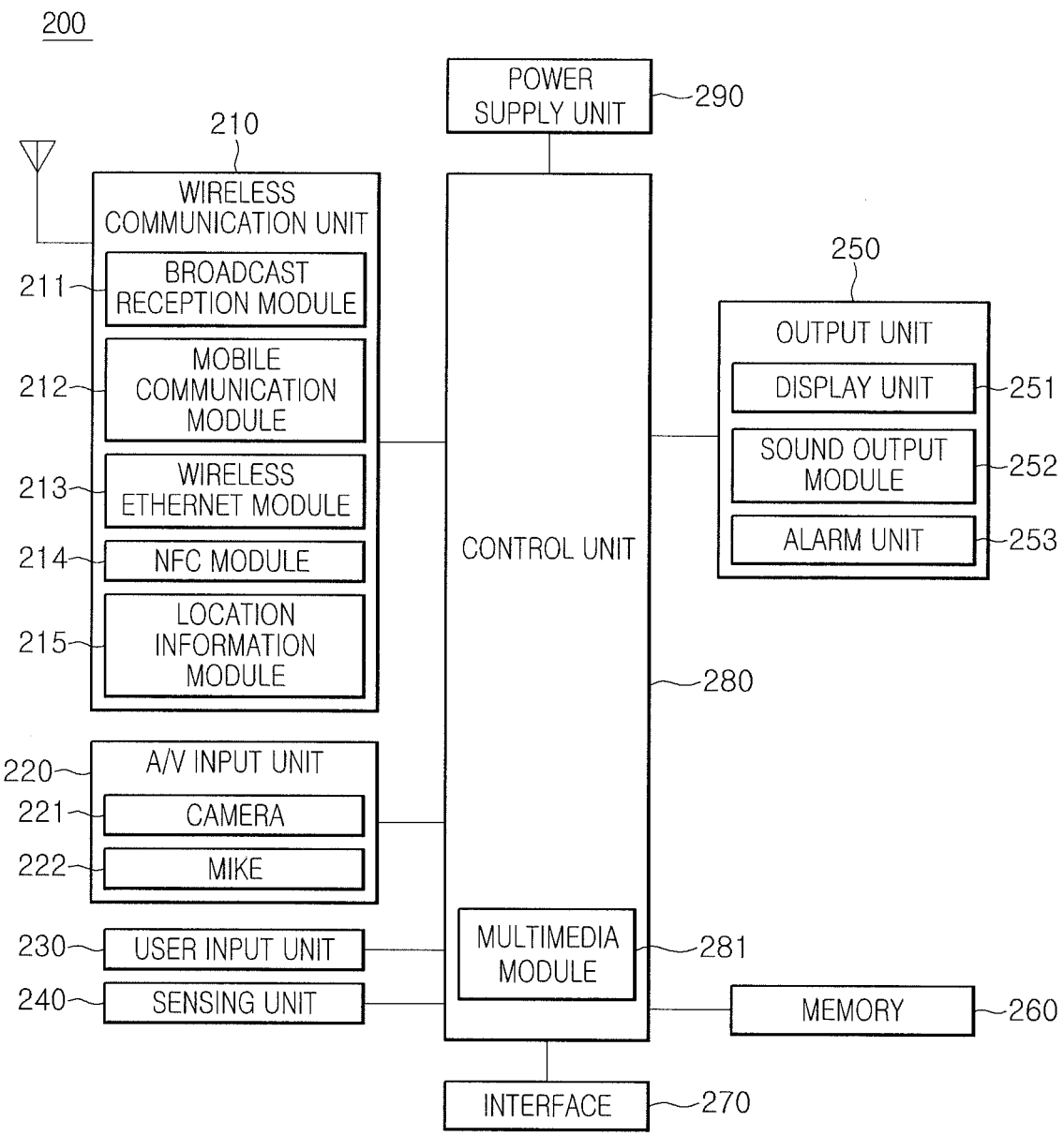
FIG. 3 is a block diagram illustrating a configuration of a mobile terminal.

FIG. 3 is a block diagram illustrating a configuration of a mobile terminal. The mobile terminal 200 may include a wireless communication unit 210, an A/V input unit 220, a user input unit 230, a sensing unit 240, an output unit 250, a memory 260, an interface 270, a control unit 280, and a power supply unit 290.

Referring to FIG. 3, the wireless communication unit 210 may be an element for wireless communication between the mobile terminal 200 and a wireless communication system, or for wireless communication between the mobile terminal 200 and a network to which the mobile terminal 200 is connected.

The wireless communication unit 210 may include a broadcast reception module 211, a mobile communication module 212, a wireless Ethernet module 213, a Near Field Communication (NFC) module 214, and/or a location information module 215.

In some implementations, the wireless communication unit 210 may transmit/receive data to/from an external device in one of various wireless communication schemes that have been described above with reference to FIG. 1.

For example, the wireless communication unit 210 may establish wireless network connection with the display device 100 according to a communication standard such as WiFi or Bluetooth, and transmit/receive content data and information for data communication to/from the display device 100 over the connected network.

The broadcast reception module 211 receives a broadcast signal and/or broadcast-related information from an external broadcast management server through a broadcast channel. The broadcast channel may include a satellite channel and/or a terrestrial broadcast channel.

The mobile communication module 211 transmits/receives a wireless signal to/from at least one of: a base station, an external terminal, and/or a server over a mobile communication network. Herein, the wireless signal may include an audio call signal, a video call signal, or various types of data based on the transmission/reception of a text message or a multimedia message.

The wireless Ethernet module 213 denotes a module for accessing wireless Internet, and may be implemented as an internal module or an external module.

The NFC module 214 is a module for NFC, and may use Bluetooth, RFID, IrDA, UWB, or Zigbee.

Moreover, the location information module 215 is a module for checking or obtaining the location of the mobile terminal 200. As an example, a Global Position System (GPS) module may be used as the location information module 215. The GPS module receives location information from a plurality of satellites.

The A/V input unit 220 is for inputting an audio signal or a video signal, and may include a camera 221 and/or a microphone 222. The camera 221 processes an image frame such as a still image or a moving image, which is obtained by an image sensor in a video call mode or a capture mode. The processed image frame may be displayed by the display unit 251.

The image frame processed by the camera 221 may be stored in the memory 160 or transmitted to the outside through the wireless communication unit 210. The camera 221 may include two or more image sensors, depending on the configuration aspect of the terminal 200.

The microphone 222 receives an external sound signal and processes the received sound signal into electric audio data, in a call mode, a record mode, or an audio recognition mode.

The user input unit 230 generates input data in order for the user to control an operation of the terminal 200. The user input unit 230 may include a key pad, a dome switch, a touch screen (constant pressure/power failure), a jog wheel, and/or a jog switch.

The sensing unit 240 may include various sensors such as a touch sensor, a magnetometer, an accelerometer, a proximity sensor, a gyroscope sensor, an ambient light sensor, a colorimeter, and/or a tag, for sensing the current state of the mobile terminal 200.

For example, the sensing unit 240 may sense the touch of the display device 100 or detect a location/orientation where the mobile terminal 200 touches the display device 100, by using the sensor.

The interface 270 interfaces with all external devices connected to the mobile terminal 200. For example, the interface 270 may include a wired/wireless headset port, an external charger port, a wired/wireless data port, a memory card port, a port for the connection of a device including an identification module, an audio Input/Output (I/O) port, a video I/O port, and/or an earphone port.

Moreover, the output unit 250 is for outputting an audio signal or a video signal, and may include a display unit 251, a sound output module 252, and/or an alarm unit 253.

The display unit 251 displays and outputs information processed by the mobile terminal 200. For example, when the mobile terminal 200 is in the call mode, the display unit 251 displays a User Interface (UI) or a Graphic User Interface (GUI) associated with call. When the mobile terminal 200 is in the video call mode or the capture mode, the display unit 251 displays a captured and/or received image, a UI, or a GUI.

The sound output module 252 outputs audio data that is received from the wireless communication unit 210 or stored in the memory 260, in a call signal reception mode, a call mode, a record mode, an audio recognition mode, or a broadcast reception mode.

The memory 260 may store a program for the processing and control of the control unit 280, and temporarily store input/output content data (e.g., a moving image file, a still image file, a music file, a document file, an application file, or the like).

The control unit 280 controls the overall operation of the mobile terminal 200. For example, the control unit 280 performs control and processing related to voice call, data communication, and video call. Moreover, the control unit 280 may include a multimedia module 281 for replaying multimedia content. The multimedia module 281 may be included in the control unit 280 or implemented independently from the control unit 280.

The power supply unit 290 receives an external power or an internal power to supply the power necessary for an operation of each element, according to the control of the control unit 280.

FIG. 3 illustrates a mobile terminal including various elements, but the illustrated elements are not all essential elements. That is, the mobile terminal 200 may include elements more than the elements of FIG. 3, or at least one of the illustrated elements may not be applied.

In some implementations, when the mobile terminal 200 touches the display device 100, a first region of a screen portion of the display device 100 corresponding to the touch location is designated to the mobile terminal 20, and data may be transmitted and received between the display device 100 and the mobile terminal 200 through interaction with the designated first region.

For example, a user may touch the mobile terminal 200 to a front screen portion of the display device 100 to designate a first region corresponding to the mobile terminal 200. The designated first region may be displayed on a screen of the display device 100. Touch need not include physical contact. Thus, in some implementations, touch may be imparted through a closeness in proximity between the mobile terminal 200 and the display device 100 that enables detection of the touch and thus acts as a surrogate for physical contact.

The user may allow content stored in the display device 100 to be transmitted to the mobile terminal 200 by interacting with the designated first region. Similarly, the user may also allow content stored in the mobile terminal 200 to be transmitted to the display device 100 by interacting with the designated first region.

Figure 4:
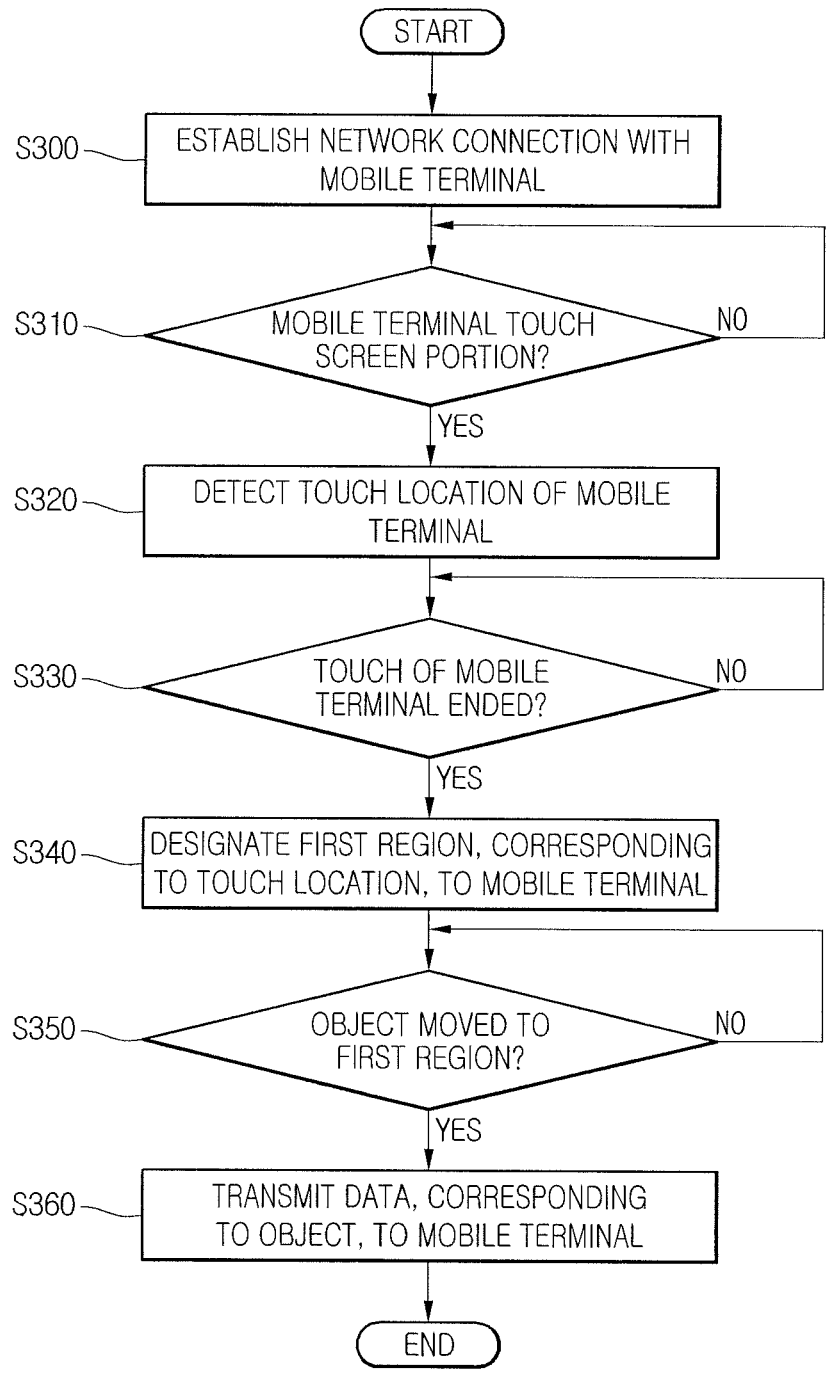
FIG. 4 is a flowchart illustrating a method of transmitting and receiving data.

FIG. 4 is a flowchart illustrating a method of transmitting and receiving data, and illustrates a method where the display device 100 controls the transmission/reception of data to/from the mobile terminal.

Referring to FIG. 4, the display device 100 establishes network connection with the mobile terminal 200 in operation S300.

For example, the network interface 120 of the display device 100 may transmit/receive information for network establishment to/from the mobile terminal 200 according to a corresponding communication standard, for data communication with the mobile terminal 200 using a wireless communication scheme such as WiFi, Bluetooth, UPnP/DLBNA, or UWB. The network interface 120 may establish a wireless network connection on the basis of the transmitted/received network establishment information.

Network establishment information, transmitted/received between the display device 100 and the mobile terminal 200 for the network connection, may include identification (ID) information of each device, ID information regarding a corresponding network, and security information (e.g., a password).

In some embodiments, a program (for example, a content-sharing application) for executing a method of transmitting and receiving data may be preinstalled in each of the display device 100 and the mobile terminal 200.

In order for the display device 100 and the mobile terminal 200 to share content, before operation S300, an operation of registering the mobile terminal 200 in the display device 100 may be performed, and also, when the mobile terminal 200 requests network connection, an operation of authenticating the mobile terminal 200 may be further performed on the basis of the registered information.

In a state where a wireless communication function such as WiFi or Bluetooth is being activated in the display device 100 and the mobile terminal 200, if the content-sharing application installed in the mobile terminal 200 is executed, the display device 100 and the mobile terminal 200 may search for each other and establish network connection.

For this end, the mobile terminal 200 may store a plurality of encryption keys and a Service Set IDentifier (SSID) for WiFi network connected to the display device 100.

When the mobile terminal 200 touches the screen portion of the display device 100 in operation S310, the display device 100 detects a touch location of the mobile terminal 200 in operation S320. In some implementations, the network connection with the mobile terminal 200 is established before detecting the touch location of the mobile terminal 200. However, in other implementations, the network connection may be established or after or as a consequence (i.e., triggered from) detecting the touch location of the mobile terminal 200.

The screen portion of the display device 100 may denote a portion of the front of the display device 100 that displays an image when viewed by a user.

For example, the display unit 180 of the display device 100 may include a display panel (not shown) displaying an image, and a backlight unit (not shown) that is disposed at the rear of the display panel and supplies light to the display panel, in which case the screen portion touching the mobile terminal 200 may denote the front of the display panel.

When a functional layer such as an optical sheet or a touch panel is formed at the front of the display panel, the screen portion touching the mobile terminal 200 may denote a functional layer formed at the front of the display panel.

Moreover, the mobile terminal 200 touching the screen portion of the display device 100 denotes that the mobile terminal 200 physically touches the screen portion, and may also include a case (which is not the physical touch) where the mobile terminal 200 is very closely adjacent to the screen portion within a touch-detectable distance from the display device 100 or the mobile terminal 200.

In some implementations, the display unit 180 of the display device 100 may be realized as a touch screen, which may be disposed at the front of the display panel and sense the touch of an object such as a user's finger.

The touch panel determines the touch location of the object and converts the touch location into an electric signal to output the electric signal. The display device 100 may perform a function corresponding to the touch location.

The touch panel may include a plurality of touch sensors for sensing the touch and touch location of the object, and the touch sensors may sense a touch in a resistive touch scheme, a light sensing touch scheme, or a capacitive touch scheme.

For example, a capacitive touch panel may sense the change of a capacitance that is formed by a conductive sensing pattern and another ambient sensing pattern or a ground electrode when touched by a user's finger or an object, and thus converts a touch location into an electric signal.

In this case, the display device 100 may sense the touch and touch location of the mobile terminal 200 with the touch panel included in the display unit 180.

When the touch of the mobile terminal 200 is ended in operation S330, a first region corresponding to the sensed touch location is designated to the mobile terminal 200 in operation S340.

For example, when the user has touched a rear of the mobile terminal 200 to the screen portion of the display device 100 for a certain time (e.g., one second) and then moves the mobile terminal 200 away from the display device 100, the first region of the screen potion of the display device 100 corresponding to the touch location of the mobile terminal 200 may be designated as a region for transmitting and receiving data from/to the mobile terminal 200.

Figure 5:
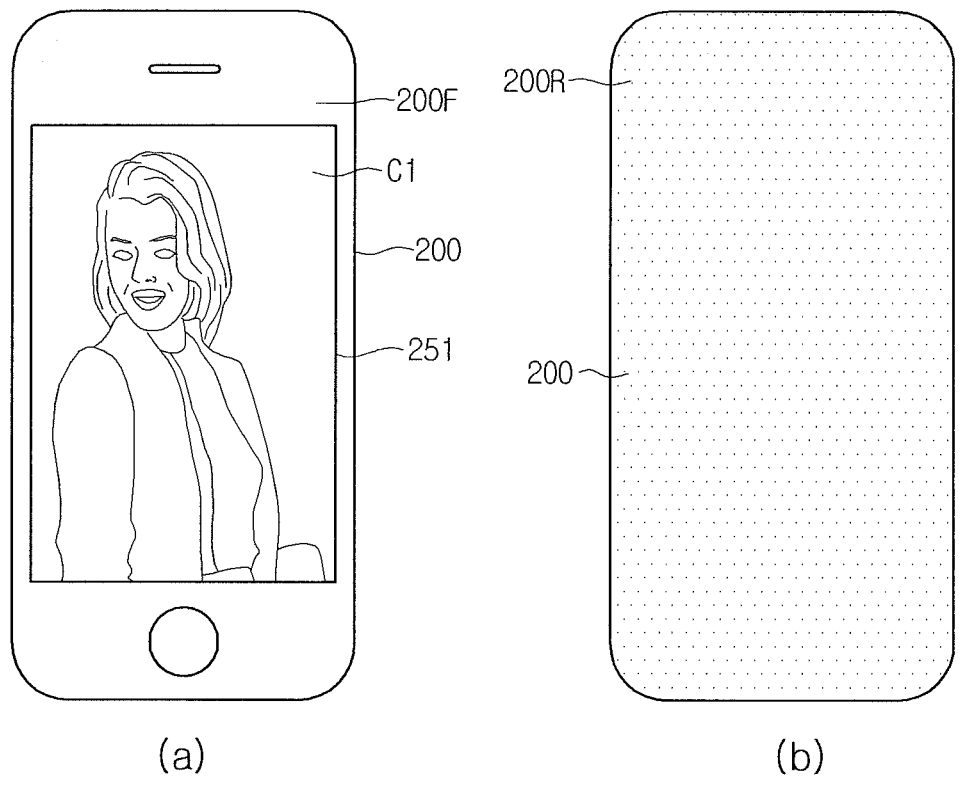
FIG. 5 is views illustrating front and rear views of a mobile terminal.

Referring to a portion (a) and portion (b) of FIG. 5, a display unit 251 displaying an image (e.g., a photograph C1) may be disposed at a front 200F of the mobile terminal 200, and a rear 200R of the mobile terminal 200 may be covered by a case.

Subsequently, when an object displayed on the screen of the display device 100 is moved to the first region in operation S350, the network interface 120 transmits data, corresponding to the object, to the mobile terminal 200 in operation S360.

Figure 6:
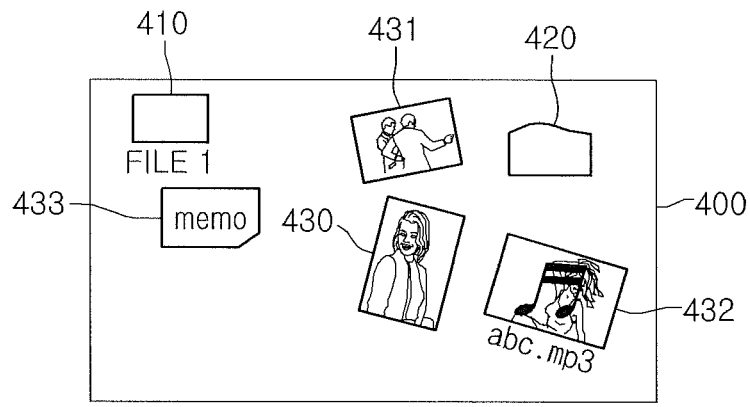
FIG. 6 is a view illustrating a screen configuration of a display device.

Referring to FIG. 6, a plurality of objects 410, 420 and 430 to 433 that respectively indicate an accessible specific file, a folder, content, etc. may be displayed on a screen 400 of the display device 100.

Each of the objects may be displayed as an identifiable icon type of image such as a thumbnail image indicating pertinent content or files, on the screen 400.

For example, the user may select a file object 410 to open (a file corresponding to a pertinent object) and move a display location of the file object 410 to an arbitrary location of the screen 400.

More specifically, when the display unit 180 is configured with a touch screen and serves as a user input means, the user may select a specific object or drag and move the selected object in a desired direction, with a tool such as a finger.

Alternatively, the user may move a display location of a specific object with a key button included in the remote controller 195, or move the display location of the specific object with the remote controller 195 having a motion recognition function.

Moreover, the folder object 420 may include a plurality of contents such as photographs, moving images, and music. The user may select the folder object 420 to check a plurality of contents included in a corresponding folder or files respectively corresponding to the contents, and then select and display desired content.

Contents stored in the display device 100, for example, thumbnail image types of content objects 430 to 432, respectively corresponding to a photograph, a moving image, an audio file, and a memo, may be displayed on the screen 400 of the display device 100.

In some implementations, when the user moves a specific object of the objects illustrated in FIG. 6 to the first region that has been designated to the mobile terminal 200 in operation S340, data (e.g., content stored in the display device 100) corresponding to the specific object may be transmitted to the mobile terminal 200.

Hereinafter, a method of transmitting and receiving data will be described in more detail with reference to FIGS. 7 to 21.

FIG. 7 illustrates a first method for designating a specific region of a screen of a display device to a mobile terminal according to a touch location of the mobile terminal.

Referring to a portion (a) of FIG. 7, the user may move the mobile terminal 200 such that the rear 200R of the mobile terminal 200 is oriented toward the display device 100, and thus touch the rear 200R of the mobile terminal 200 to an empty region of the screen portion of the display device 100 in which an object is not displayed.

In this case, the display device 100 may detect a touch location of the mobile terminal 200 and simultaneously determine whether an orientation is the front or rear of the mobile terminal 200.

For example, the sensing unit 150 of the display device 100 may detect the orientation of the mobile terminal 200 by using various sensors such as a magnetic field sensor, an accelerometer sensor, a proximity sensor, a Gyro sensor, an ambient light sensor, and/or a color meter.

The user may touch any one of the front, rear and side of the mobile terminal 200 to the screen portion of the display device 100, and when touched, the sensing unit 150 may detect the orientation in which the mobile terminal 200 is touched.

The control unit 160 of the display device 100 may determine the orientation of the mobile terminal 200 by using a sensing value outputted from the sensing unit 150. Also, the control unit 160 may use the sensing value of the sensing unit 150 and information received from the mobile terminal 200, for determining the orientation. The information received from the mobile terminal 200 may be a sensing value measured by the sensing unit 240 of the mobile terminal 200.

On the other hand, the orientation of the mobile terminal 200 may be detected by the sensing unit 240 or control unit 280 of the mobile terminal 200, in which case information regarding the orientation of the mobile terminal 200 may be received by the display device 100 over the network that has been connected in operation S300.

When the user has touched the rear 200R of the mobile terminal 200 to an empty region of the screen portion of the display device 100 for a predetermined time (e.g., for one second or more) and then moves the rear 200R away from the screen portion, as illustrated in a portion (b) of FIG. 7, a first region 500 corresponding to the touch location may be designated to the mobile terminal 200 and displayed on a screen 400.

In some implementations, the displayed first region 500 may include identification information of the mobile terminal 200. For example, an indication of a name of the mobile terminal 200 (e.g., "Mobile 1") may be displayed in the first region 500. Alternatively or additionally, the first region 500 may include a graphical representation corresponding to the mobile terminal 200. The graphical representation may be any visual representation displayed on displayed device 100 and need not reflect any visual characteristics of the mobile device.

In this case, a location of the designated first region and the identification information of the mobile terminal 200 may be stored in the storage unit 170 of the display device 100 in association with each other.

FIG. 8 illustrates a first method of transmitting and receiving data by using a region designated to a mobile terminal.

Referring to FIG. 8, a user may move an object 430, displayed on a screen 400, to a first region 500 designated to the mobile terminal 200, and thus allow content, corresponding to the object 430, to be transmitted to the mobile terminal 200.

For example, as illustrated in a portion (a) of FIG. 8, the user may drag, with a tool such as a finger, the photograph object 430 displayed on the screen 400 of the display device 100 and move the photograph object 430 toward the first region 500 designated to the mobile terminal 200. For this end, the display unit 180 of the display device 100 may be implemented as a touch screen.

As illustrated in a portion (b) of FIG. 8, when the user touches and drags the photograph object 430, a virtual image 430' of the photograph object 430 may move toward the first region 500.

Subsequently, when the user drops the virtual image 430' of the photograph object 430 (by, for example, removing her finger from the screen) at a location where at least one portion of virtual image 430' overlaps with the first region 500, photograph content corresponding to the photograph object 430 may be transmitted to the mobile terminal 200.

It can be known to the user that a display attribute such as color of the first region 500 may be changed, and thus data stored in the display device 100 may be transmitted to the mobile terminal 200, at a time when the photograph object 430 moves to the first region 500, Referring to a portion (c) of FIG. 8, when the user moves and drops the photograph object 430 to the first region 500, a photograph corresponding to the photograph object 430 may be transmitted to the mobile terminal 200 and displayed on a screen 251 of the mobile terminal 200.

The method of transmitting and receiving data has been described above with reference to FIG. 8 as an example of when the display device 100 and the mobile terminal 200 share the photograph, but the method is not limited thereto. For example, the display device 100 and the mobile terminal 200 may share various contents such as a moving image, music, an application, contact information, a video streaming service, a video call, a game, and news, in addition to the photograph.

Figure 9:
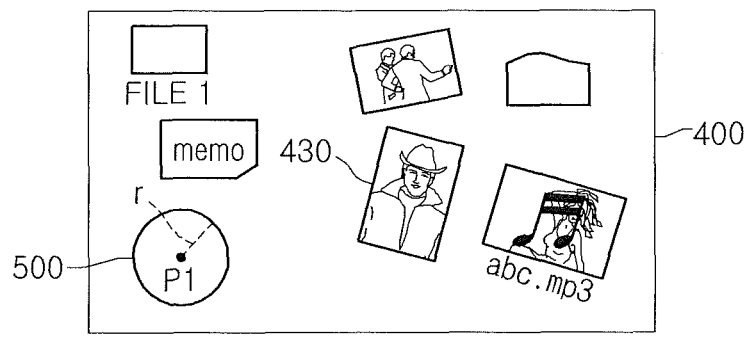
FIG. 9 is a view illustrating a first a method for displaying a region, designated to a mobile terminal, on a screen of a display device.

FIG. 9 illustrates a first method for displaying a region, designated to a mobile terminal, on a screen of a display device.

Referring to FIG. 9, a first region 500 may be generated in a circular shape having a predetermined radius 'r' from a touch location P1 of the mobile terminal 200 in a screen portion of the display device 100.

The touch location P1 of the mobile terminal 200 may correspond to a location of a sensor sensing the touch of the mobile terminal 200 among a plurality of sensors included in the display device 100, for detecting a touch location.

The touch location P1 of the mobile terminal 200 may alternatively be defined as a central point of a region, touched by the mobile terminal 200, in the screen portion of the display device 100.

As described above, when the first region 500 is generated according to the touch location of the mobile terminal 200, information regarding the generated first region 500 and the identification information of the mobile terminal 200 may be stored in the storage unit 170.

For example, as shown in Table 1 below, the touch location of the mobile terminal 200 and information regarding an identifier (ID) and orientation of a terminal may be stored in the storage unit 170 in association with each other.

TABLE 1

| Terminal ID | Orientation | Touch location |
|---|---|---|
| 1 | Rear | P1 |

Referring to FIG. 1, the information stored in the storage unit 170 may denote that the first region 500 designated to the mobile terminal 200 having a terminal ID of 1 has been generated with the touch location P1 of the mobile terminal 200 as its center.

Therefore, when a specific object displayed on the screen 400 moves, the control unit 160 of the display device 100 may determine whether the object overlaps with the circular first region 500 having the radius 'r' from the touch location P1.

When the determined result shows that the object has moved to a location overlapping with the first region 500, the control unit 160 may control the network interface 120 such that data corresponding to the object is transmitted to the mobile terminal 200.

In the above description, it has been described as an example that the first region 500 designated to the mobile terminal 200 is generated a circular shape, but the method is not limited thereto. The first region 500 may be generated in various shapes other than a circular shape and displayed on the screen 400.

Figure 10:
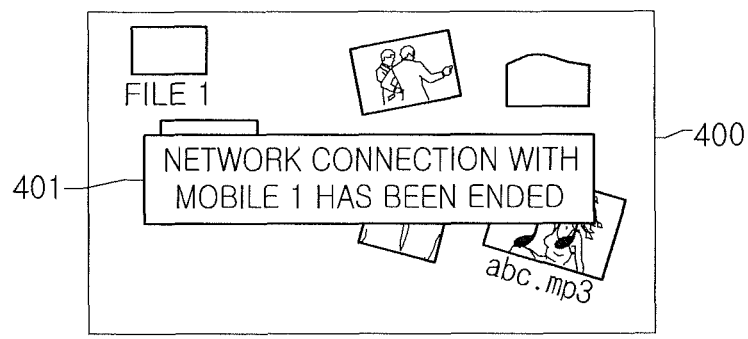
Figure 11:
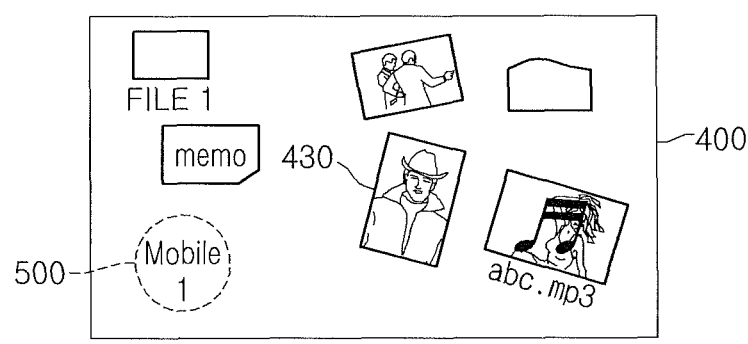

FIGS. 10 to 12 illustrate a method of managing a region designated to a mobile terminal according to a network connection state.

Referring to FIG. 10, when network connection between the display device 100 and the mobile terminal is ended, the first region 500 designated to the mobile terminal 200 may be removed.

For example, when the mobile terminal 200 moves to outside a region where the mobile terminal 200 can wirelessly communicate with the display device 100 or network between display device 100 and the mobile terminal 200 is disconnected due to a network error, a popup window 401 indicating "network connection has been ended" is displayed on a screen 400, and simultaneously, the first region 500 may be removed from the screen 400 of the display device 100.

The first region 500 may be removed according to a user input, in addition to the end of network connection. For example, when the user draws an X mark in the first region 500 displayed on the screen 400 with a tool such as a finger, the first region 500 may be removed from the screen 400.

In this way, when the first region 500 has been removed, the information regarding the first region 500 that has been described above with reference to Table 1 may be deleted from the storage unit 170.

Referring to FIG. 11, as described above, when network connection between the display device 100 and the mobile terminal is ended, the first region 500 designated to the mobile terminal 200 may be displayed in an inactive state.

That is, when network connection between the display device 100 and the mobile terminal 200 is maintained normally, as illustrated in the portion (b) of FIG. 7, the first region 500 is displayed in an active state, but when network connection between the display device 100 and the mobile terminal 200 is ended, as illustrated in FIG. 11, the state of the first region 500 may be changed to an inactive state.

In the inactive state, the first region 500 cannot have the function that has been described above with reference to FIGS. 4 to 9.

Moreover, the state of the first region 500 may be changed to the inactive state as illustrated in FIG. 11, according to a user input.

However, when the first region 500 is deactivated, the information regarding the first region 500 that has been described above with reference to Table 1 may be deleted from the storage unit 170 and continuously stored for a case where the first region 500 is changed to an active state.

Referring to FIG. 12, when network connection between the display device 100 and the mobile terminal is reset, the first region 500 designated to the mobile terminal 200 may be again activated.

That is, when the mobile terminal 200 with which network connection was ended enters into a region where the mobile terminal 200 can wirelessly communicate with the display device 100 or a network is connected between the display device 100 and the mobile terminal 200 due to the repair of a network error, a popup window 402 indicating "network connection has been set" may be displayed on the screen 400, and the first region 500 may be activated according to a user input.

For example, as illustrated in a portion (a) of FIG. 12, the user may check the popup window 402 and then select a YES button 421 displayed on a screen 400 to change the state of the first region 500 to an active state.

In this case, as illustrated in a portion (b) of FIG. 12, the first region 500 designated to the mobile terminal 200 may be displayed in an active state on the screen 400 and perform the function that has been described above with reference to FIGS. 4 to 9.

In some implementations, a location or size of the first region 500 displayed on the screen 400 may be changed according to a user input.

Referring to FIG. 13, a user may drag the first region 500, displayed on a screen 400, in a desired direction to move a display location of the first region 500.

For example, as illustrated in a portion (a) of FIG. 13, the user may drag the first region 500 displayed on the screen 400 of the display device 100 to move the first region 500 in a desired direction, with a tool such as a finger.

As illustrated in a portion (b) of FIG. 13, when the user touches and drags the first region 500, a virtual image 500' of the first region 500 may be generated and moved in a drag direction by the user.

Subsequently, when the user drops the virtual image 500' of the first region 500 to a desired location, as illustrated in a portion (c) of FIG. 13, the location of the first region 500 may move.

For example, when a central location of the first region 500 is moved to a location P2, the information regarding the first region 500 stored in the storage unit 170 may be changed as in Table 2.

TABLE 2

| Terminal ID | Orientation | Touch location |
|---|---|---|
| 1 | Rear | P2 |

Referring to FIG. 14, a user may enlarge or reduce the first region 500, displayed on a screen 400, to a desired size.

For example, when the user touches two side points of the first region 500, displayed on the screen 400 of the display device 100, with tools such as two fingers and then moves the two fingers in mutually opposite directions so as to increase an interval between the two points, the first region 500 may be enlarged in proportion to a distance by which the two fingers are moved.

In this case, information regarding the enlarged size of the first region 500 may be stored in the storage unit 170.

In some implementations, a plurality of regions respectively designated to a plurality of mobile terminals may be generated and displayed on a screen of the display device 100.

Hereinafter, a method that respectively designates a plurality of regions on a screen of a display device to a plurality of mobile terminals to transmit and receive data will be described with reference to FIGS. 15 to 18.

Referring to FIG. 15, the first region 500 and a second region 501 on a screen 400 of the display device 100 may be designated to the mobile terminal 200 and another mobile terminal 201 and displayed, respectively.

Hereinafter, the mobile terminal 200 will be referred to as a first mobile terminal 200, and the mobile terminal 201 will be referred to as a second mobile terminal 201.

As illustrated in a portion (a) of FIG. 15, in a state where the first region 500 designated to the first mobile terminal 200 is being displayed on the screen 400, a user may touch a rear of the second mobile terminal 201 to the screen portion of display device 100.

When the user has touched the rear of the second mobile terminal 201 to the screen portion of the display device 100 for a predetermined time (e.g., for one second or more) and then moves the rear away from the screen portion, as illustrated in a portion (b) of FIG. 15, the second region 501 designated to the second mobile terminal 201 and the first region 500 designated to the first mobile terminal 200 may be displayed on the screen 400 of the display device 100.

As described above with reference to FIG. 8, when the user moves one of a plurality of objects, displayed on the screen 400, to the displayed second region 501, content corresponding to the moved object may be transmitted to the second mobile terminal 201.

Moreover, as described above, when the second region 501 is generated according to a touch location of the second mobile terminal 201, information regarding the second region 501 may be additionally stored in the storage unit 170 of the display device 100 as in Table 3 below.

TABLE 3

| Terminal ID | Orientation | Touch location |
|---|---|---|
| 1 | Rear | P1 |
| 2 | Rear | P3 |

Referring to Table 3, the information stored in the storage unit 170 may indicate that the second region 501 designated to the second mobile terminal 201 having a terminal ID of 2 has been generated with a location P3 as its center.

Referring to FIG. 16, a plurality of regions respectively designated to a plurality of mobile terminals may be combined as one region, and thus, the mobile terminals may share the same content.

For example, as illustrated in a portion (a) and portion (b) of FIG. 16, when the user touches the second region 501, designated to the second mobile terminal 201, with a tool such as a finger and then drags the second region 501 to the first region 500, the first and second regions 500 and 501 may be combined as one region 510 and displayed on the screen 400.

As described above, when the first and second regions 500 and 501 may be combined as the one region 510, as shown in Table 4 below, the information stored in the storage unit 170 of the display device 100 may be changed.

TABLE 4

| Terminal ID | Orientation | Touch location |
|---|---|---|
| 1, 2 | Rear | P1 |

The user may move an object, displayed on the screen 400, to the combined region 510 and thus allow data corresponding to the moved object to be transmitted to the first and second mobile terminals 200 and 201.

As illustrated in a portion (b) and portion (c) of FIG. 16, when the user drags the photograph object 430 displayed on the screen 400 to move and drop the photograph object 430 to the combined region 510, a photograph corresponding to the photograph object 430 may be transmitted to the first and second mobile terminals 200 and 201 and displayed on the respective screens of the first and second mobile terminals 200 and 201.

Figure 17:
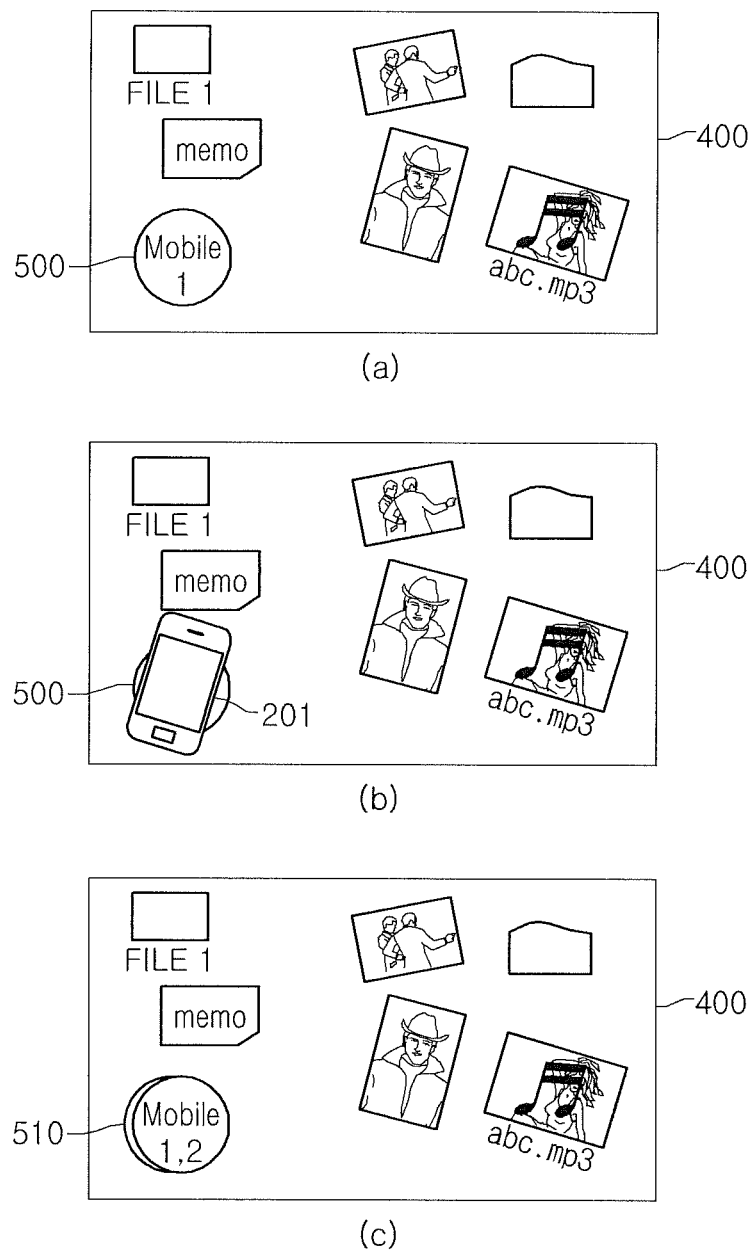

Referring to FIG. 17, in a state where the first region 500 designated to the first mobile terminal 200 is being displayed on the screen 400, the user may touch the rear of the second mobile terminal 201 to a location overlapping with the first region 500.

In this case, the first region 500 may be designated to the first and second mobile terminals 200 and 201 and changed to the combined region 510 that has been described above with reference to FIG. 16.

The combined region 510 that has been described above with reference to FIGS. 16 and 17 may be again segmented into a plurality of separate regions.

Figure 18:
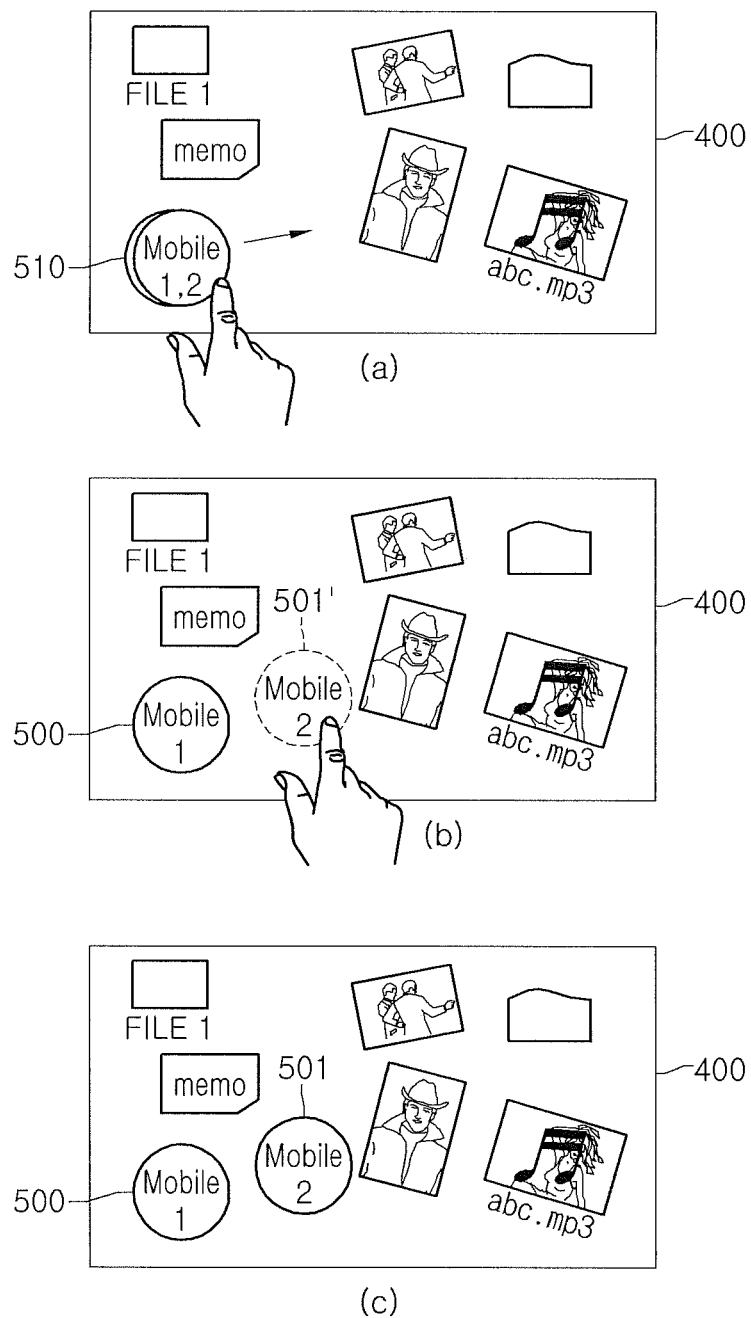

Referring to a portion (a) and portion (b) of FIG. 18, when the user touches and drags the combined region 510 with a tool such as a finger, a virtual image 501' corresponding to the second region 501 designated to the second mobile terminal 201 may be moved outward from the combined region 510 and displayed on the screen 400.

Subsequently, when the user drops the virtual image 501' corresponding to the second region 501 to a desired location, the second region 501 designated to the second mobile terminal 201 may be displayed on the screen 400.

When the second region 501 is separated from the combined region 510, as shown in Table 5 below, the information stored in the storage unit 170 of the display device 100 may be changed.

TABLE 5

| Terminal ID | Orientation | Touch location |
|---|---|---|
| 1 | Rear | P1 |
| 2 | Rear | P4 |

Referring to Table 5, Table 5 shows that the second region 501 designated to the second mobile terminal 201 having a terminal ID of 2 has been separated to a location with a location P4 as its center and displayed.

A case, where the two mobile terminals 200 and 201 touch the screen portion of the display device 100 and thus the regions 500 and 501 for transmitting and receiving data are generated, has been described above as an example, but the method is not limited thereto.

For example, three or more regions respectively designated to three or more mobile terminals may be displayed on the screen 400 of the display device 100, in which case only one region may be designated to one mobile terminal (e.g., 200).

In some implementations, when a front of the mobile terminal 200 touches the screen portion of the display device 100, data stored in the mobile terminal 200 may be received by the display device 100 by using the first region 500 that has been described above with reference to FIGS. 4 to 18.

FIG. 19 illustrates a second method for designating a specific region of a screen of a display device to a mobile terminal according to a touch location of the mobile terminal.

Referring to a portion (a) of FIG. 19, the user may move the mobile terminal 200 such that the front 200F of the mobile terminal 200 is oriented to the display device 100, and thus touch the front 200F of the mobile terminal 200 to an empty region of the screen portion of the display device 100 in which an object is not displayed.

For example, when the user has touched the front 200F of the mobile terminal 200 to an empty region of the screen portion of the display device 100 for a predetermined time (e.g., for one second or more) and then moves the front 200F away from the screen portion, as illustrated in a portion (b) of FIG. 19, a first region 520 corresponding to the touch location may be designated to the mobile terminal 200 and displayed on a screen 400.

When the first region 520 is generated, as shown Table 6 below, information regarding the first region 520 designated to the mobile terminal 200 may be stored in the storage unit 170.

TABLE 6

| Terminal ID | Orientation | Touch location |
|---|---|---|
| 1 | Front | P5 |

Referring to Table 6, the information stored in the storage unit 170 may indicate that the first region 520 designated to the mobile terminal 200 having a terminal ID of 1 has been generated with a touch location P5 of the mobile terminal 200 as its center, and an orientation of the mobile terminal 200 is the front.

Referring to FIG. 20, the user may select the first region 520 on the screen 400, and thus allow content, stored in the mobile terminal 200, to be transmitted to the display device 100.

For example, as illustrated in a portion (a) and portion (b) of FIG. 20, when the user touches and selects the first region 520 with a tool such as a finger, a content list 521 stored in the mobile terminal 200 may be displayed on the screen 400 of the display device 100.

For this end, in generating the first region 520, the mobile terminal 200 may transmit information regarding the contents stored therein to the display device 100.

Subsequently, as illustrated in the portion (b) of FIG. 20, when the user makes a motion that selects at least one content (for example, Content 1) for transmitting from a content list displayed on a screen 400 and moves the selected list to outside the content list 521, the content 'Content 1' may be transmitted from the mobile terminal 200 to the display device 100.

Referring to a portion (c) of FIG. 20, the content 'Content 1' is received from the mobile terminal 200, and simultaneously, an object 434 corresponding to the content 'Content 1' may be displayed on a screen 400 of the display device 100.

Figure 21:
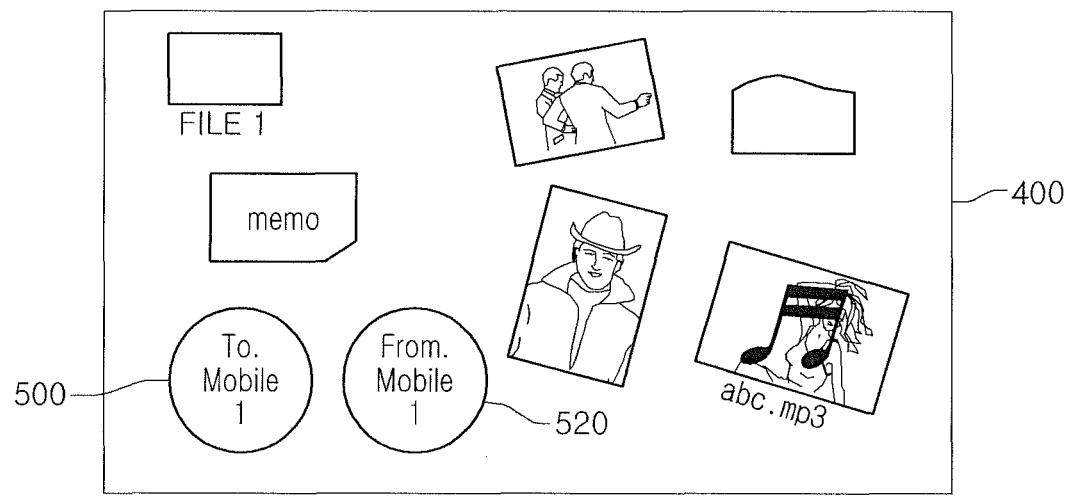
FIG. 21 is a view illustrating a second method for displaying a region, designated to a mobile terminal, on a screen of a display device.

FIG. 21 illustrates a second method for displaying a region, designated to a mobile terminal, on a screen of a display device.

Referring to FIG. 21, the first region 500 generated by touching the front of the mobile terminal 200 and the first region 520 generated by touching the rear of the mobile terminal 200 may be displayed together on a screen 400 of the display device 100.

For example, the user may transmit the content, stored in the display device 100, to the mobile terminal 200 by using the first region 500 that has been generated by touching the front, and the display device 100 may receive the content stored in the display device 100 by using the first region 520 that has been generated by touching the rear.

To determine two first regions 500 and 520 designated to the mobile terminal 200, as illustrated in FIG. 21, a name of the first region 500 may be displayed as "To. Mobile 1", and a name of the first region 520 may be displayed as "From. Mobile 1".

Alternatively, the first regions 500 and 520 may be displayed to be differentiated with different colors or shapes.

Information regarding the two first regions 500 and 520 designated to the mobile terminal 200 may be stored in the storage unit 170 as in Table 7 below.

TABLE 7

| Terminal ID | Orientation | Touch location |
|---|---|---|
| 1 | Rear | P1 |
| 2 | Front | P5 |

Hereinafter, implementations of each configuration of a display device and mobile terminal that perform a method of transmitting and receiving data will be described with reference to FIGS. 22 to 30.

In some implementations, a display device 100 may include a touch screen, and detect a touch and touch location of the mobile terminal 200 by using the touch screen.

In some implementations, before performing the method of transmitting and receiving data that has been described above with reference to FIGS. 4 to 21, a registration process and authentication process for the mobile terminal 200 may be performed.

For example, the registration process corresponds to a stage that stores identification information of the mobile terminal 200 in the display device 100 and thus allows the mobile terminal 200 to share content with the display device 100. The authentication process corresponds to a stage that checks whether a corresponding element has been registered in the mobile terminal 200 that approaches the display device 100 for sharing content.

Figure 22:
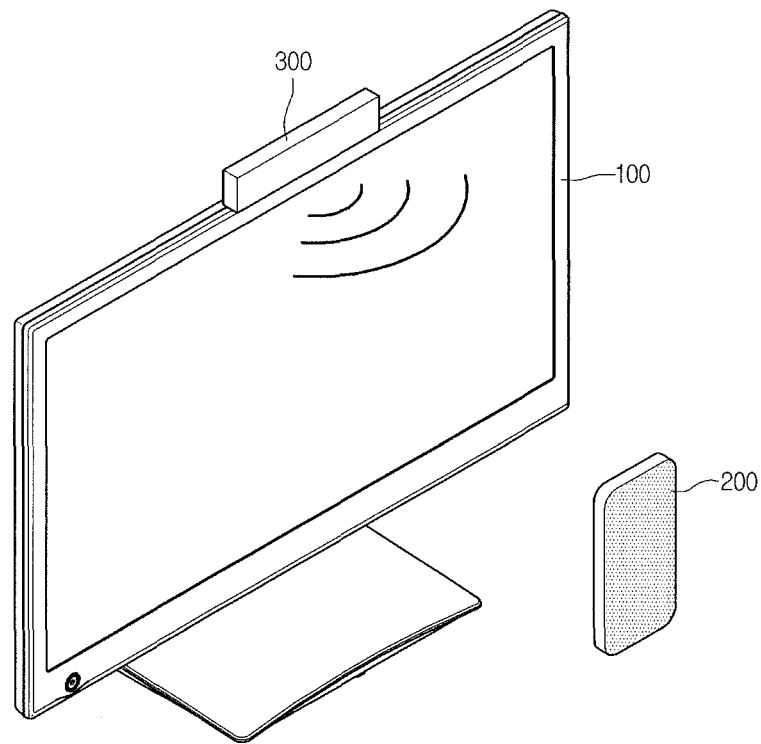

Referring to FIG. 22, the display device 100 includes a Frequency Modulation (FM) transmitter 300, which may transmit an FM signal including registration information over an FM frequency band.

For example, the FM transmitter 300 may scan a plurality of FM frequency bands, and transmit a Radio Data System (RDS) signal, including a password and identification information (e.g., a network ID) for a wireless network, over an FM frequency band in a carousel scheme.

The RDS signal may have identification information for identifying data included in the RDS payload. The RDS signal transmitted from the FM transmitter 300 may include a unique identifier, as a bit sequence (ID), for identifying the registration information.

Moreover, the network identification information (e.g., the network ID) and password included in the RDS signal is encrypted, and the mobile terminal 200 may store a plurality of keys for decrypting the encrypted network identification information (e.g., the network ID) and password. The encryption keys may be changed for security with the elapse of time, and the changed encryption key may be pre-provided to the display device 100 and the mobile terminal 200.

When the mobile terminal 200 executes an application for sharing content with the display device 100, identification information (ID) for the mobile terminal 200 may be given, and the mobile terminal 200 may scan an FM spectrum.

In an operation of scanning the FM spectrum, the mobile terminal 200 may check a unique ID bit sequence included in the RDS payload to detect the RDS signal transmitted from the display device 100.

Subsequently, the mobile terminal 200 extracts the encrypted network ID and password from the detected RDS signal, and decrypts the encrypted network ID and password with a prior key.

The mobile terminal 200 may establish a wireless network connection with the display device 100 by using the decrypted network ID and password.

The mobile terminal 200 may transmit the identification information (ID) of the mobile terminal 200 and user information (e.g., a user name, a photograph, etc.) to the display device 100 over the connected network.

The display device 100 may store the identification information (ID) of the mobile terminal 200 received from the mobile terminal 200 to register a corresponding terminal.

In an operation of scanning the FM spectrum, when the RDS signal transmitted from the display device 100 is not detected, the mobile terminal 200 may display the message "unable to connect network for sharing content with the display device 100".

In some implementations, a wireless network for connecting the display device 100 and the mobile terminal 200 may be based on a WiFi wireless communication standard, and thus, registration information transmitted using an RDS signal may include an ID and password of a WiFi network.

Referring to FIG. 23, the above-described registration information may be transferred from the display device 100 to the mobile terminal 200 through a pattern 310 using a steganography mechanism.

First, when the display device 100 executes an application for sharing content and the mobile terminal 200 executes an application for sharing content, the display device 100 may display the pattern 310 including encrypted information for network establishment.

In this case, the user may focus a camera (not shown), included in the mobile terminal 200, on the pattern 310 to allow the pattern 310 to be displayed on a screen 251 of the mobile terminal 200.

The mobile terminal 200 may collect information (e.g., a WiFi network ID and a password) for network establishment from an image of the acquired pattern 310, and establish wireless network connection with the display device 100 on the basis of the collected information.

The mobile terminal 200 may transmit its identification information (e.g., a model number or International Mobile Equipment Identity (IMEI) serial) to the display device 100 over the connected wireless network, and the transmitted identification information of the mobile terminal 200 may be stored and registered in the display device 100.

Hereinafter, various methods of detecting the orientation of the mobile terminal 200 will be described in detail with reference to FIGS. 24 to 30.

Figure 24:
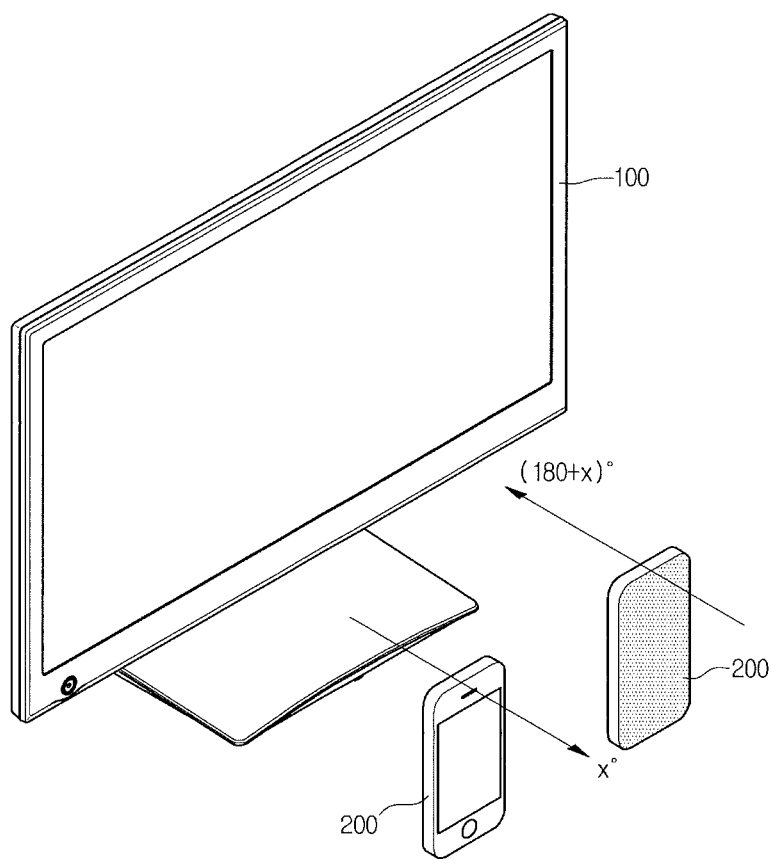

Referring to FIG. 24, the mobile terminal 200 may include a magnetometer. The mobile terminal 200 may detect the orientation with the magnetometer and transmit information regarding the orientation to the display device 100.

For example, as illustrated in FIG. 24, the mobile terminal 200 may determine the orientation as the front when an output value of the magnetometer indicates 180 degrees or more, and transmit information indicating "the orientation is the front" to the display device 100.

In this case, in touching the mobile terminal 200, the display device 100 may request the transmission of content to the mobile terminal 200 on the basis of the received information regarding the orientation, and receive content data selected by the mobile terminal 200.

The mobile terminal 200 may determine the orientation as the rear when the output value of the magnetometer indicates less than 180 degrees, and transmit information indicating "the orientation is the rear" to the display device 100.

In this case, in touching the mobile terminal 200, the display device 100 may transmit content data to the mobile terminal 200 on the basis of the received information regarding the orientation.

Moreover, as shown in Table 8 below, the detected orientation of the mobile terminal 200 and the identification information (ID) of the mobile terminal 200 may be stored and managed by the display device 100 in linkage with each other.

TABLE 8

| ID | Orientation |
|----|-------------|
| 10 | Front |
| 21 | Rear |
| 51 | Front |

Figure 25:
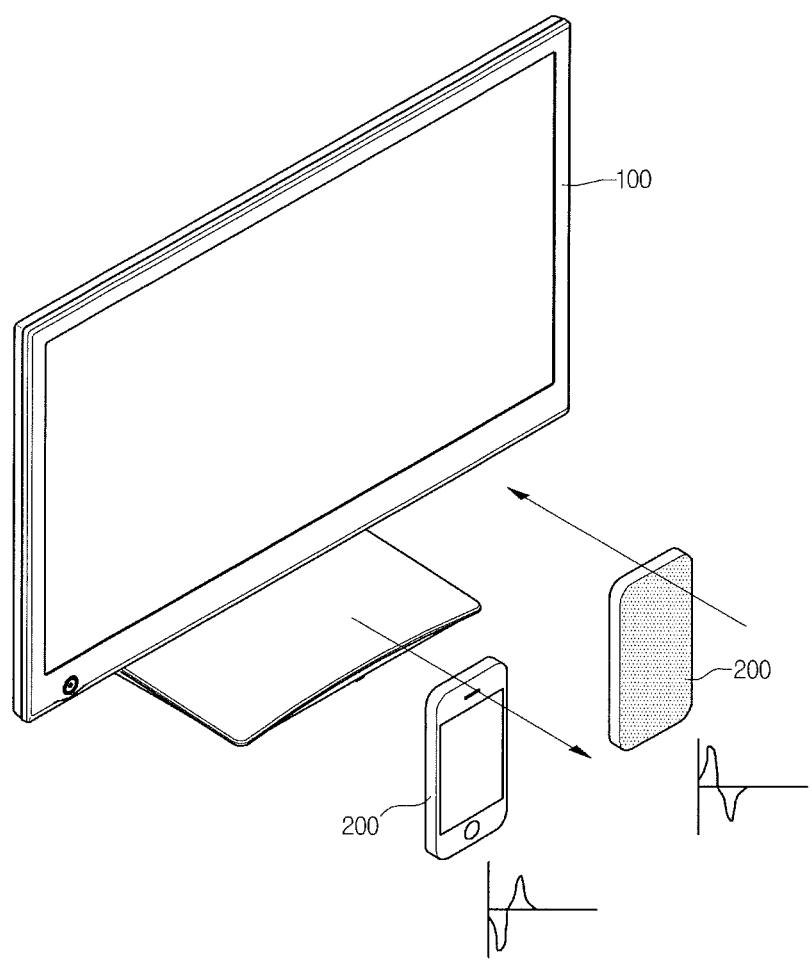

Referring to FIG. 25, the mobile terminal 200 may include an accelerometer. The mobile terminal 200 may detect the orientation by using an output value of the accelerometer.

For example, as illustrated in FIG. 25, a value that the accelerometer measures along an moving axis of the mobile terminal 200 when the orientation is the front is opposite to a value that the accelerometer measures along the moving axis of the mobile terminal 200 when the orientation is the rear, and thus, the mobile terminal 200 may detect the orientation by using the output value of the accelerometer.

Figure 26:
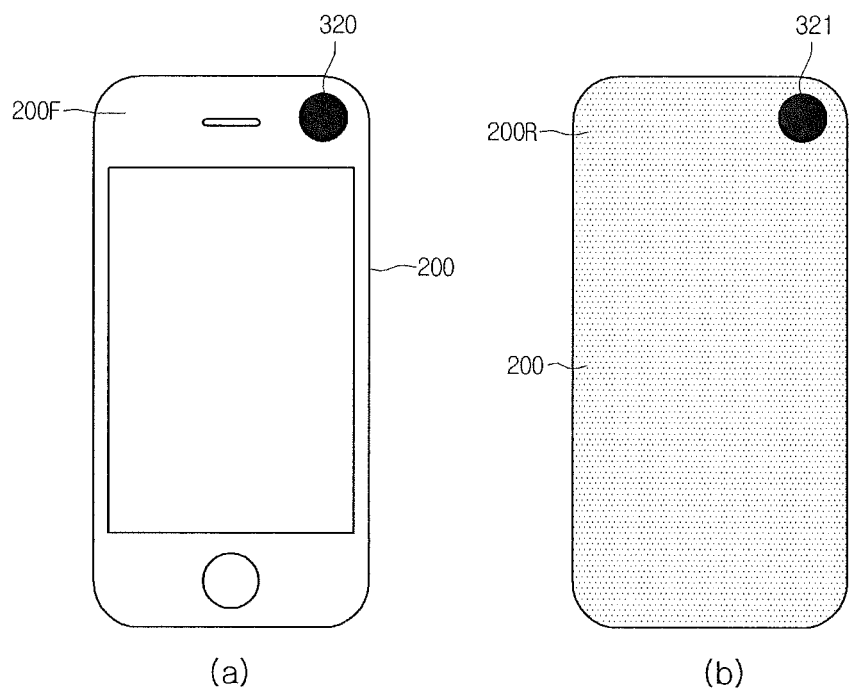

Referring to FIG. 26, the mobile terminal 200 may detect an orientation toward the display device 100 by using proximity sensors 320 and 321 respectively disposed in the front 200F and the rear 200R.

For example, when the front 200F of the mobile terminal 200 touches the screen portion 181 of the display device 100, the proximity sensor 320 disposed in the front 200F of the mobile terminal 200 may sense the approach of an object, and when the rear 200R of the mobile terminal 200 touches the screen portion of the display device 100, the proximity sensor 321 disposed in the rear 200R of the mobile terminal 200 may sense the approach of an object.

Figure 27:
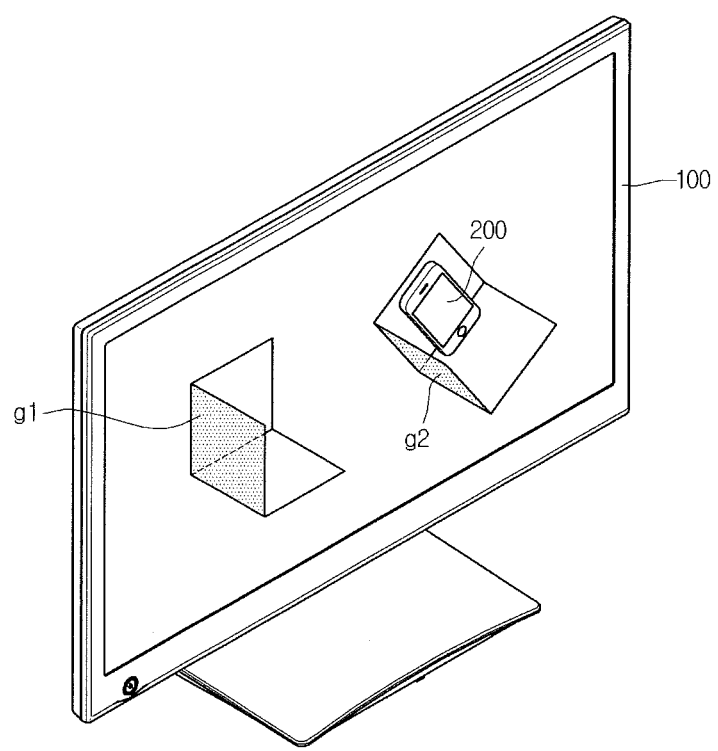

Referring to FIG. 27, the mobile terminal 200 may detect an orientation toward the display device 100 by using a gyroscope sensor.

Each of the display device 100 and the mobile terminal 200 includes a gyroscope sensor. The display device 100 may receive a specific value of the gyroscope sensor, included in the mobile terminal 200, from the mobile terminal 200 and compare the received value with a measurement value of the internal gyroscope sensor to detect the orientation of the mobile terminal 200.

That is, the display device 100 may compare an xyz axis (g1), indicating the direction of the display device 100 detected by the internal gyroscope sensor, and an xyz axis (g2), indicating the direction of the mobile terminal 200 detected by the gyroscope sensor of the mobile terminal 200, to detect the orientation.

For example, when a specific value of the gyroscope sensor included in the display device 100 is the same as a specific value of the gyroscope sensor included in the mobile terminal 200, the display device 100 may determine as touched by the rear of the mobile terminal 200.

When a difference between the xyz axis (g1) indicating the direction of the display device 100 and the xyz axis (g2) indicating the direction of the mobile terminal 200 is about 180 degrees on any one axis, the display device 100 may determine as touched by the front of the mobile terminal 200.

Moreover, when the xyz axis (g1) indicating the direction of the display device 100 differs from the xyz axis (g2) indicating the direction of the mobile terminal 200, the display device 100 may determine as touched by the side of the mobile terminal 200.

Figure 28:
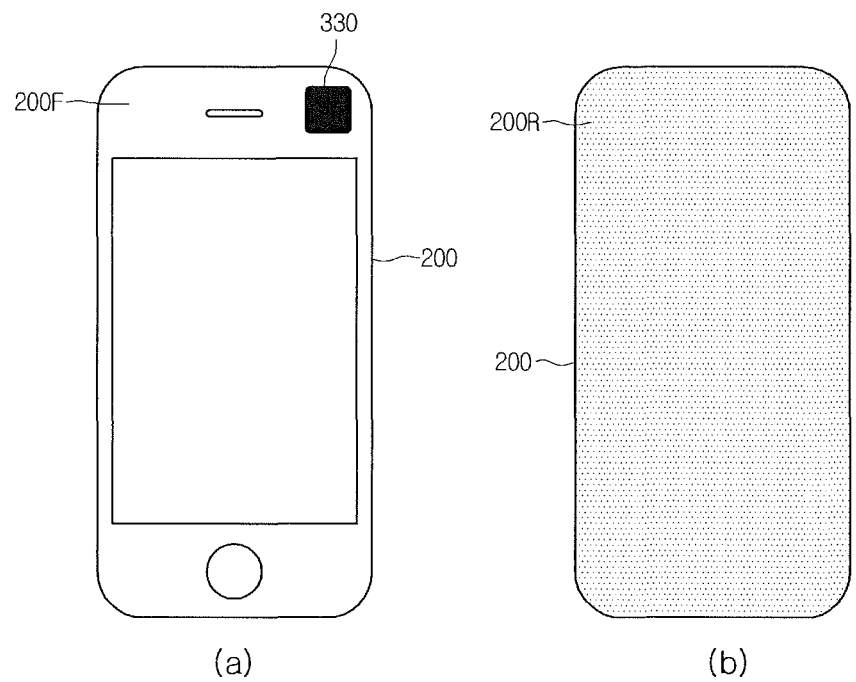

Referring to FIG. 28, the mobile terminal 200 may sense an orientation toward the display device 100 by using a light sensor 630, which may be implemented with an ambient light sensor or a colorimeter.

For example, the mobile terminal 200 may transmit color information, which has been measured by the light sensor 630 disposed in the front 200F, and the identification information (ID) of the mobile terminal 200 to the display device 100. The display device 100 may compare color information of an image, displayed at a time when the mobile terminal 200 touches the display device 100, and the color information received from the mobile terminal 200 to determine the orientation.

Figure 29:
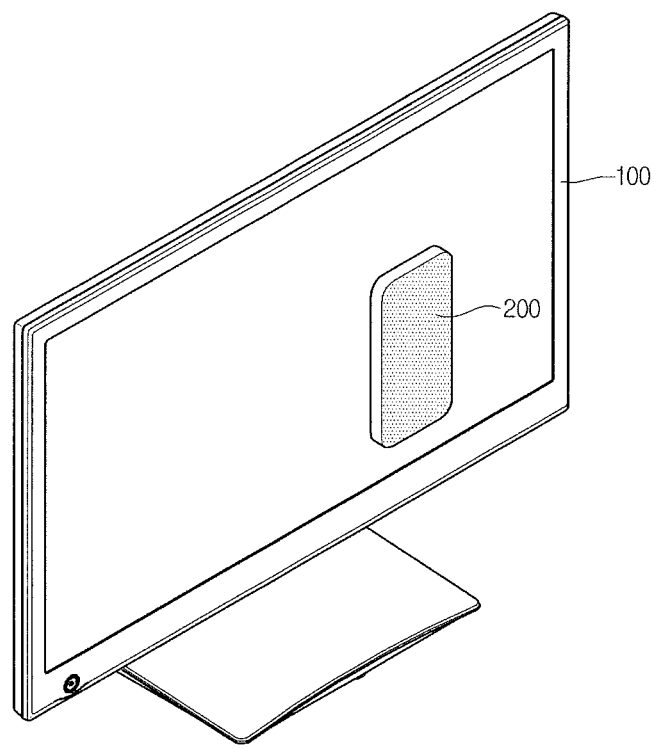

Referring to FIG. 29, when the front 200F of the mobile terminal 200 touches the screen of the display device 100, the light sensor 630 disposed in the front 200F of the mobile terminal 200 may sense an image displayed by the display device 100, and thus, color information measured by the light sensor 630 may match with color information of the image displayed by the display device 100.

Therefore, when brightness (e.g., an average brightness of a region corresponding to a location touched by the mobile terminal 200, in a displayed image) of the image displayed by the display device 100 matches with light brightness that has been measured by the ambient light sensor disposed in the front of the mobile terminal 200, based on the touched time, the display device 100 may determine that the front of the mobile terminal 200 has touched the display device 100.

Moreover, when a color temperature (e.g., a color temperature of a region corresponding to a location touched by the mobile terminal 200, in the displayed image) of the image displayed by the display device 100 matches with a color temperature that has been measured by the colorimeter disposed in the front of the mobile terminal 200 (or, when a difference between the color temperatures is within a predetermined error range), based on the touched time, the display device 100 may determine that the front of the mobile terminal 200 has touched the display device 100.

For this, the display device 100 may acquire color information of an image, displayed at the touched time, from display image data and store the acquired color information in the storage unit 170.

Figure 30:
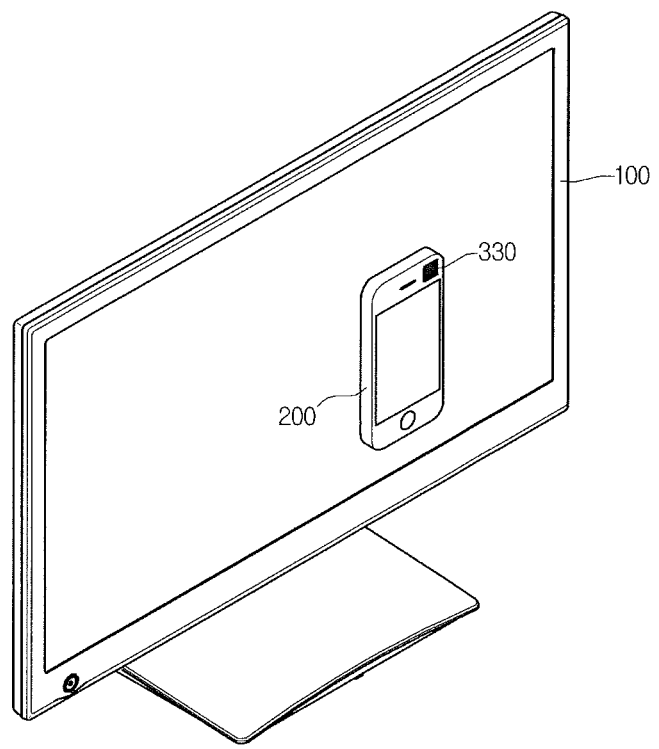

Referring to FIG. 30, when the rear 200R of the mobile terminal 200 touches the screen of the display device 100, color information measured by the light sensor 630 may differ from color information of an image displayed by the display device 100.

Therefore, when brightness (e.g., an average brightness of a region corresponding to a location touched by the mobile terminal 200, in a displayed image) of the image displayed by the display device 100 differs from light brightness that has been measured by the ambient light sensor disposed in the front of the mobile terminal 200 (or, when a difference between the brightness and the light brightness lies outside a predetermined error range), based on the touched time, the display device 100 may determine that the rear of the mobile terminal 200 has touched the display device 100.

Moreover, when a color temperature (e.g., a color temperature of a region corresponding to a location touched by the mobile terminal 200 in the displayed image) of the image displayed by the display device 100 differs from a color temperature that has been measured by the colorimeter disposed in the front of the mobile terminal 200 (or, when a difference between the color temperatures lies outside a predetermined error range), based on the touched time, the display device 100 may determine as touched by the rear of the mobile terminal 200.

In some implementations, one or more conductors are attached to each of the front and rear of the mobile terminal 200, and the touch of the mobile terminal 200 may be sensed with the conductors.

Based on these implementations, the mobile terminal 200 may sense a current, flowing through the conductors in the front, to detect that the front of the mobile terminal 200 has touched the display device 100. Alternatively, the mobile terminal 200 may sense a current, flowing through the conductors in the rear, to detect that the rear of the mobile terminal 200 has touched the display device 100.

To detect the orientation, the mobile terminal 200 may include a gyroscope sensor and an accelerometer.

For example, the mobile terminal 200 may detect the orientation with a three-axis gyroscope sensor or a two-axis gyroscope sensor, and then transmit information regarding the detected orientation to the display device 100.

Hereinafter, other implementations of each configuration of a display device and a mobile terminal that perform the above-described method of transmitting and receiving data will be described with reference to FIGS. 31 to 34.

In some implementations, a display device 100 may include a plurality of Near Field Communication (NFC) tags, which may be used to detect whether the mobile terminal 200 touches the display device 100 and the touch location of the mobile terminal 200.

NFC is a branch of RFID, and is a near field wireless communication scheme that has been defined as a standard in ISO 18902 for transmitting low-power data at a frequency of 13.56 MHz in a near field. Also, NFC may perform near field wireless communication at various frequency bands such as 125 KHz, 135 KHz and 900 MHz, in addition to a frequency of 13.56 MHz.

Figure 31:
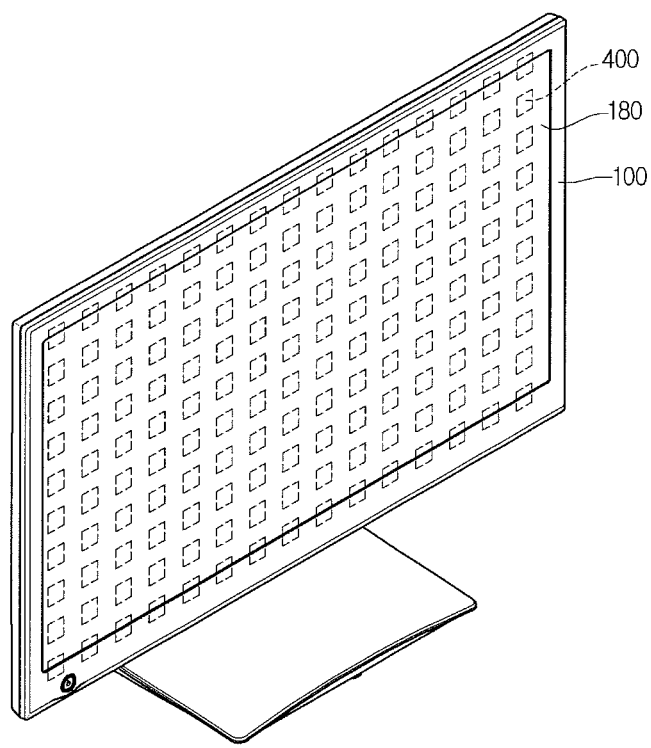
FIGS. 31 to 34 are views illustrating a second configuration of a mobile terminal and a display device that perform a method of transmitting and receiving data.

Referring to FIG. 31, the display device 100 may include a plurality of NFC tags 700 disposed in the rear of the display unit 180. The NFC tag 700 may be a passive NFC tag.

The NFC tag 700 may store manufacturer information regarding the display device 100, a model name, a model number, identification information (e.g., a serial number) of a corresponding device, and a tag index for identifying a location at which a corresponding NFC tag is disposed. Herein, the tag index may represent the location of the NFC tag 700 as a coordinate (x, y).

That is, the serial number among the information stored in the NFC tag 700 varies per display device and is used to identify a corresponding display device 100. The tag index varies per NFC tag and is used to identify the location of a corresponding NFC tag 700.

Figure 32:
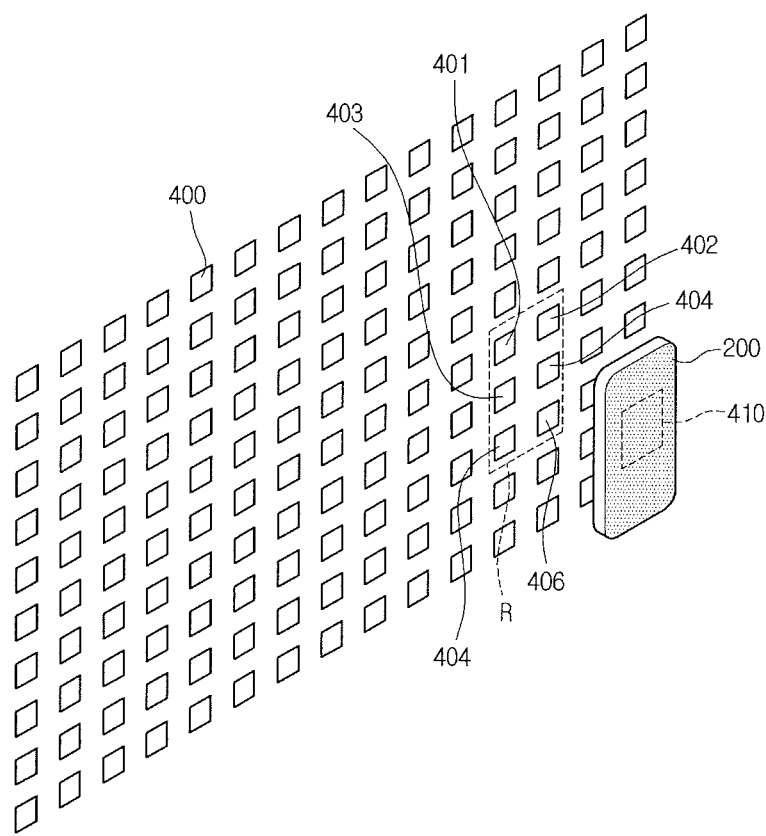

Referring to FIG. 32, the mobile terminal 200 may include an NFC reader 710. Herein, the NFC reader 710 may transmit one or more signals to the NFC tag 700 included in the display device 100. The NFC reader 710 activates the NFC tag by using a signal of a certain frequency band (e.g., a frequency band of 13.56 MHz) and may read data stored in the activated tag 700.

The NFC reader 710 included in the mobile terminal 200 may read data from an NFC tag that is located within a certain distance, for example, about 4 cm, from the mobile terminal 200.

Therefore, when the mobile terminal 200 touches the display device 100 and approaches to within 4 cm from an NFC tag disposed in the rear of the display unit 180, the NFC reader 710 included in the mobile terminal 200 may receive information stored in the NFC tag.

For example, as illustrated in FIG. 32, when the mobile terminal 200 touches the display device 100, the NFC reader 200 included in the mobile terminal 200 may read information that is stored in a plurality of NFC tags 701 to 706, disposed in a touch region R of the mobile terminal 200, among a plurality of NFC tags.

The mobile terminal 200 may check manufacturer information, a model name, a model number, and a serial number that are read with the NFC reader 710, and detect that the mobile terminal 200 has touched the display device 100.

In order to detect the touch of the mobile terminal 200 by using the NFC tag 700 included in the display device 100 and the NFC reader 710 included in the mobile terminal 200, as described above, a distance from the front of the display device 100 to the NFC tag 700 may be set to a certain distance (e.g., 4 cm) within which data stored in the NFC tag 700 may be read or a value slightly greater than the certain distance.

That is, as illustrated in FIG. 31, when the NFC tag 700 is disposed in the rear of the display unit 180, the thickness (e.g., a sum of the thicknesses of the display panel and backlight unit) of the display unit 180 may have the certain distance or a value slightly greater than the certain distance.

Moreover, the mobile terminal 200 may detect the touch location with a tag index that is read with the NFC reader 710.

For example, the mobile terminal 200 touching the display device 100 may read a tag index from each of the NFC tags 701 to 706 disposed in the touch region R, and detect a location, touched by the mobile terminal 200, with coordinates (x, y) of the read tag indexes.

As shown in Table 9, information regarding the detected touch location of the mobile terminal 200 may be stored in the storage unit 170 of the display device 100, with location coordinates of the NFC tag 700.

TABLE 9

| Terminal ID | Orientation | Touch location |
|---|---|---|
| 10 | Front | (10, 50) |

Data stored in the NFC tags 700 may be a plurality of UPnP device description parameters, respectively. When the mobile terminal 200 touches the display device 100, the mobile terminal 200 may detect whether the touch occurs and a touch location by using the UPnP device description parameters that are read from the NFC tag 700 with the NFC reader 710.

The UPnP device description parameters may be used to facilitate the above-described registration and authentication operations for the mobile terminal 200.

Figure 33:
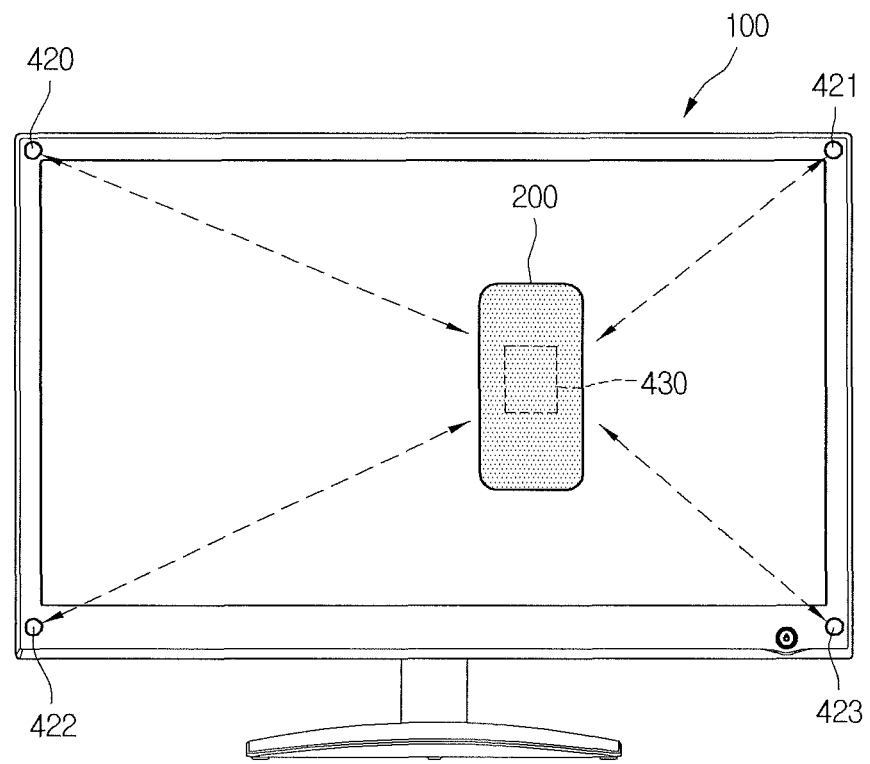

Referring to FIG. 33, the display device 100 may read data (e.g., the UPnP device description parameters), stored in an RFID tag 730 of the mobile terminal 200, with a plurality of RFID readers 720 to 723 disposed at an edge portion.

The display device 100 may compare the intensities of respective RF signals received from the RFID readers 720 to 723 to detect the touch location of the mobile terminal 200.

For example, when the intensities of respective RF signals received from the RFID readers 720 to 723 are the same, the touch location of the mobile terminal 200 may be determined as the center portion of the display device 100, and as the intensity of an RF signal received from a specific RFID reader becomes greater, the touch location may be moved to be adjacent to a corresponding RFID reader.

Figure 34:
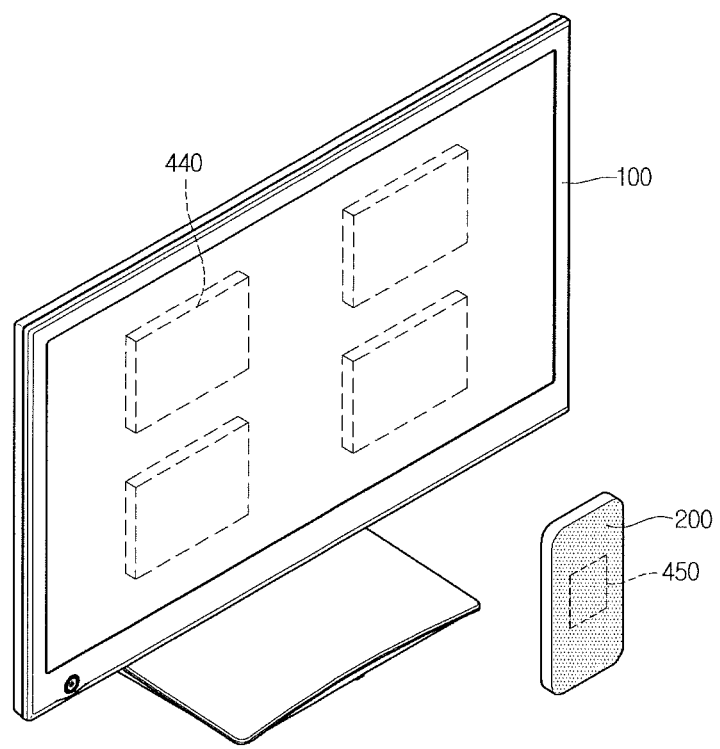

Referring to FIG. 34, an RFID reader 440 is included in the display device 100, and the RFID tag 730 is included in the mobile terminal 200. Therefore, the display device 100 and the mobile terminal 200 may perform the operations that have been described above with reference to FIGS. 31 to 33, respectively.

The display device 100 may receive a plurality of sensing values (e.g., information regarding the orientation of the mobile terminal 200 or an output value of a sensor for sensing the orientation) measured by the sensing unit 240 of the mobile terminal 200, in the RFID near field wireless communication scheme that has been described above with reference to FIGS. 31 to 33.

FIGS. 35 to 41 are views illustrating further implementations of each of a mobile terminal and a display device that are configured to perform a method of transmitting and receiving data. A touch location and orientation of the mobile terminal may be detected with a catadioptric camera included in the display device 100.

Figure 35:
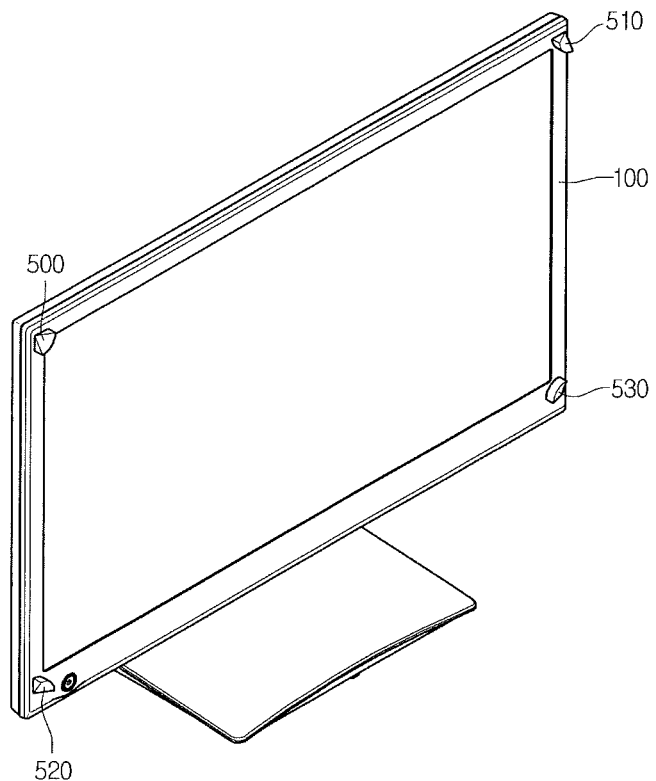
FIGS. 35 to 41 are views illustrating a third configuration of a mobile terminal and a display device that perform a method of transmitting and receiving data.

Referring to FIG. 35, a plurality of catadioptric cameras 800 to 830 may be installed at an edge portion of the display device 100.

Figure 36:
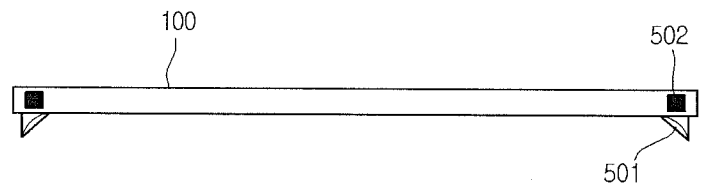

The catadioptric camera 800, as illustrated in FIG. 36, may include a catadioptric reflector 801 having a low profile, and a camera 802 having a special lens system. The catadioptric reflector 801 may be implemented with a convex mirror having a certain focal length.

Figure 37:
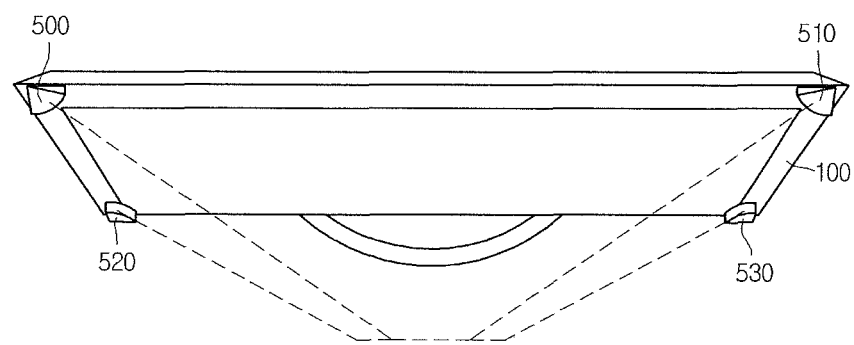

The display device 100 may acquire an image of the screen portion from four different perspectives, with the catadioptric cameras 800 to 830 having the above-described configuration, and thus may secure a field of view as illustrated in FIG. 37.

Figure 38:
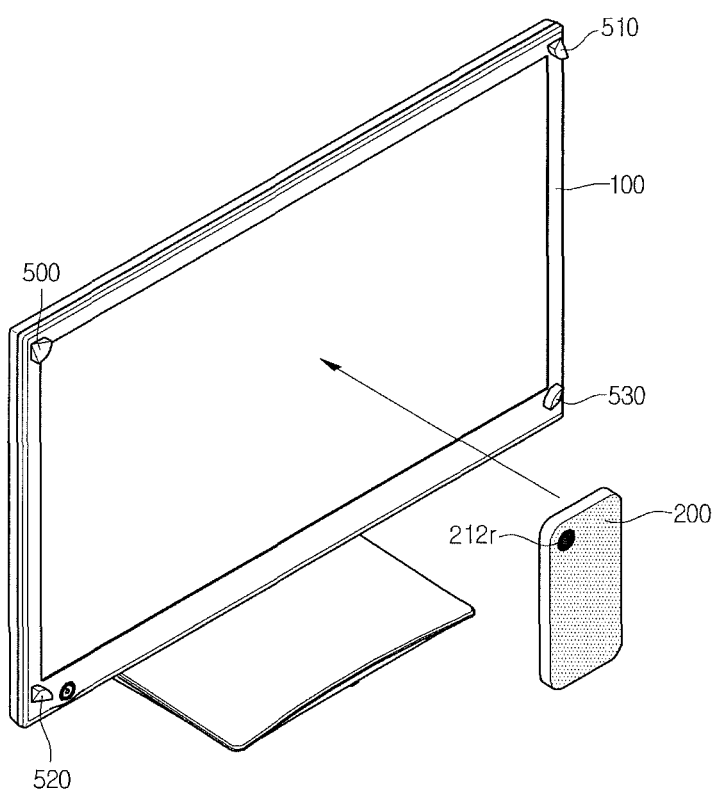

Referring to FIG. 38, when a user moves the front of the mobile terminal 200 toward the display device 100 and the mobile terminal 200 is positioned within a field of view of one or more of the catadioptric cameras 800 to 830 illustrated in FIG. 37, cameras 212f and 212r respectively disposed in the front and rear of the mobile terminal 200 may operate, and thus, the display device 100 and the mobile terminal 200 may recognize each other with the catadioptric cameras 800 to 830 and the front camera 212f.

In this case, the mobile terminal 200 may determine the orientation of the mobile terminal 200 as the front by using the image of the display device 100 that has been acquired with the front camera 212f, or the display device 100 may determine the orientation as the front by using the image (e.g., a front shape of the mobile terminal 200) of the mobile terminal 200 that has been acquired with one or more of the catadioptric cameras 800 to 830.

Figure 39:
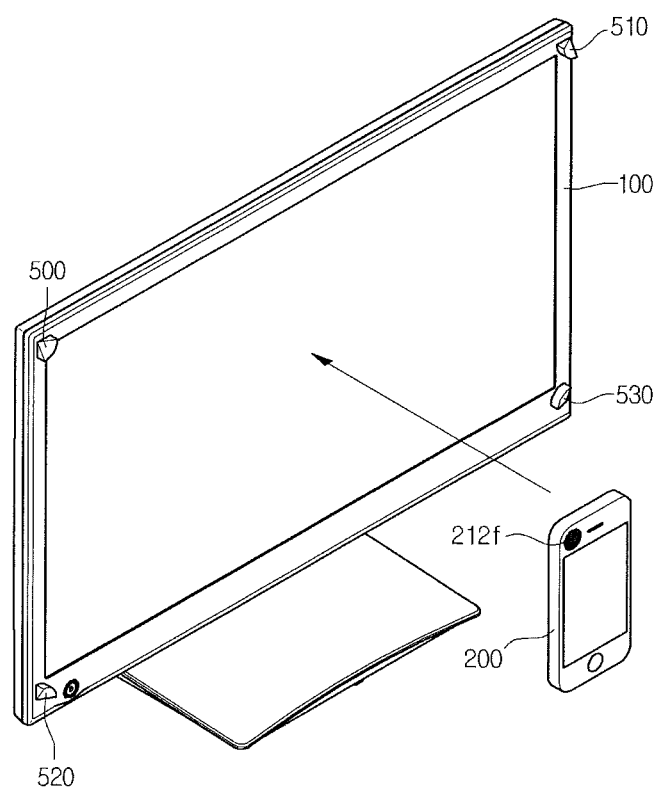

Referring to FIG. 39, when the user moves the rear of the mobile terminal 200 toward the display device 100 and the mobile terminal 200 is positioned within a field of view of one or more of the catadioptric cameras 800 to 830, the display device 100 and the mobile terminal 200 may recognize each other with the catadioptric cameras 800 to 830 and the rear camera 212r.

In this case, the mobile terminal 200 may determine the orientation of the mobile terminal 200 as the rear by using the image of the display device 100 that has been acquired with the rear camera 212r, or the display device 100 may determine the orientation as the rear by using the image (e.g., a rear shape of the mobile terminal 200) of the mobile terminal 200 that has been acquired with one or more of the catadioptric cameras 800 to 830.

Figure 40:
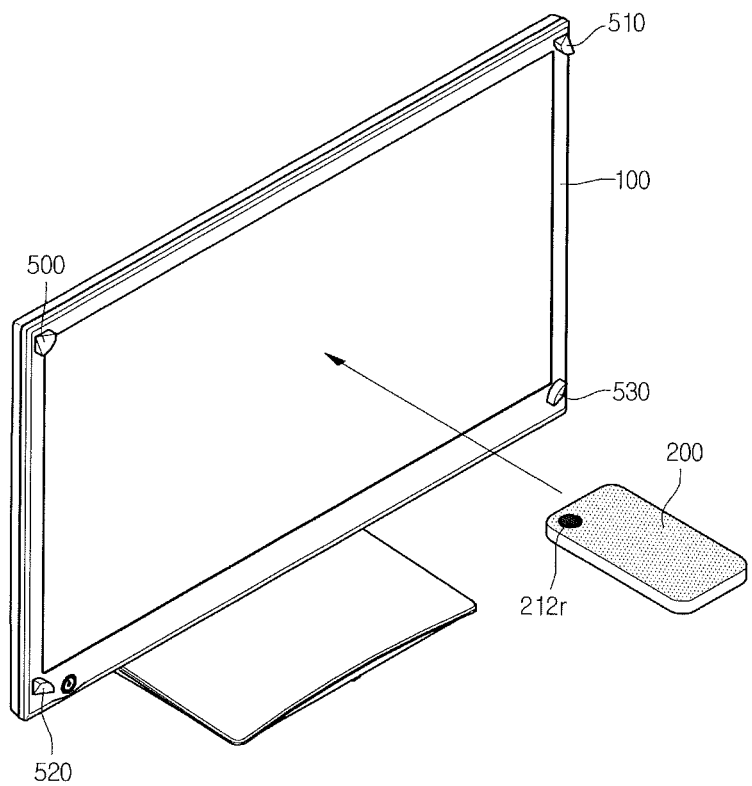

Referring to FIG. 40, when the user moves the side of the mobile terminal 200 toward the display device 100 and the mobile terminal 200 is positioned within a field of view of one or more of the catadioptric cameras 800 to 830, the display device 100 and the mobile terminal 200 may recognize each other with the catadioptric cameras 800 to 830, the front camera 212f, and the rear camera 212r.

In this case, the mobile terminal 200 may determine the orientation of the mobile terminal 200 as the side by using the image of the display device 100 that has been acquired with the front camera 212f and the rear camera 212r, or the display device 100 may determine the orientation as the side by using the image (e.g., a front shape and rear shape of the mobile terminal 200) of the mobile terminal 200 that has been acquired with one or more of the catadioptric cameras 800 to 830.

Alternatively, at a time when the mobile terminal 200 is positioned within a field of view of one or more of the catadioptric cameras 800 to 830, the magnetometer, accelerometer, proximity sensor, gyroscope sensor, ambient light sensor, or colorimeter included in the mobile terminal 200 may operate in conjunction with the catadioptric cameras 800 to 830, and thus, the orientation may be detected by the above-described scheme.

When the mobile terminal 200 touches the display device 100, the display device 100 may detect the orientation of the mobile terminal 200 by using an image that is acquired with the catadioptric cameras 800 to 830.

Figure 41:
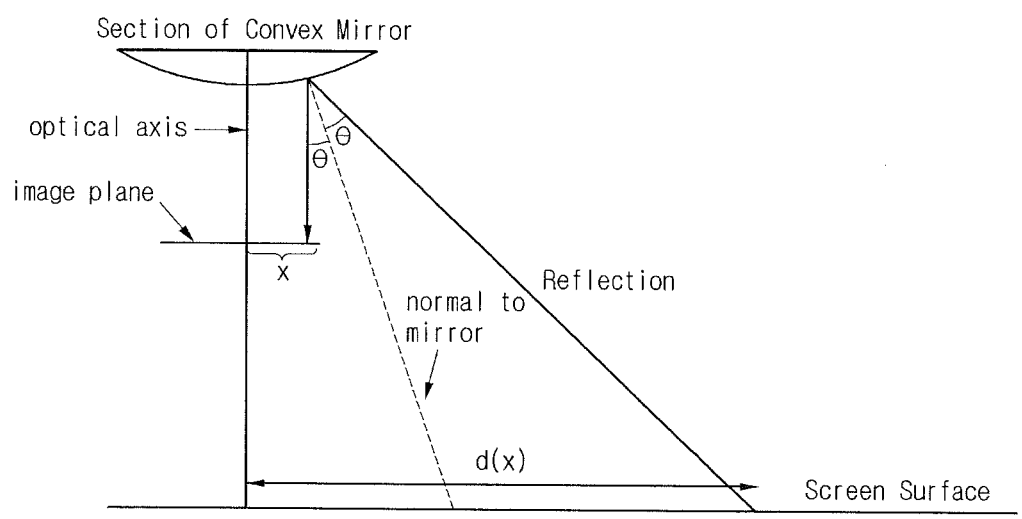

Referring to FIG. 41, a distance $d(x)$ from the optical axis of the catadioptric camera 800 to a touch point P may be calculated as a distance 'x' on an image plane and an angle ($\theta$) of a line vertical to the convex mirror.

As described above, when distances $d(x)$ to the touch point P have been calculated with the four catadioptric cameras 800 to 830 respectively disposed at the edge portions of the display device 100, the display device 100 may determine the touch location of the mobile terminal 200 with the calculated distances $d(x)$.

In the above description, various implementations of a method that detects whether the mobile terminal 200 touches the display device 100 and the touch location and orientation of the mobile terminal 200 have been described, but are not limited thereto.

For example, the display device 100 may detect whether the mobile terminal 200 touches the display device 100 and the touch location of the mobile terminal 200 by using a plurality of light sources (e.g., IR LED emitters) disposed at respective edge portions and a plurality of IR photodetectors.

The various methods described herein may be manufactured as programs executable in computers and be stored in a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can be distributed over network-coupled computer systems so that the computer readable code is stored and executed in a distributed fashion. Also, functional programs, codes, and code segments for accomplishing the various methods described herein can be easily construed by programmers skilled in the art to which the various methods pertain.

By designating a region of the screen of a display device corresponding to the touch location of a mobile terminal as a region for controlling the transmission/reception of data from/to the mobile terminal, an intuitive user interface may be provided that may allow a user to easily control the transmission/reception of data between the display device and the mobile terminal.

Although various implementations have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of communicating data with a mobile terminal, the method comprising:
    establishing a communication connection with a mobile terminal;
    detecting a touch location on a display surface of a display device at which the mobile terminal touches the display device;
    designating, at an area of the display surface of the display device, a first region corresponding to the touch location;
    determining that an object displayed on the display surface of the display device is moved into the designated first region; and
    transmitting data, corresponding to the object, to the mobile terminal based on the determination that the object is moved into the designated first region,
    wherein:
        detecting a touch location on a display surface of a display device at which the mobile terminal touches the display device includes detecting that the mobile terminal touches a region of the display surface of the display device where no object is displayed, and
        designating, at an area of the display surface of the display device, a first region, corresponding to the touch location, includes designating, based on detecting that the mobile terminal touches a region of the display surface of the display device where no object is displayed, a first region, corresponding to the touch location, to the mobile terminal on the display surface of the display device, and not designating an area of the display surface as the first region corresponding to the touch location when detecting that the mobile terminal touches a region of the display surface of the display device where an object is displayed.

2. The method according to claim 1, wherein detecting a touch location on a display surface of the display device at which the mobile terminal touches the display device includes detecting that the mobile terminal touches the display device for at least a threshold amount of time.

3. The method according to claim 1, further comprising storing a location of the designated first region and identification information of the mobile terminal in association with each other.

4. The method according to claim 1, further comprising displaying a graphical representation corresponding to the mobile terminal in the first region on the display surface of the display device.

5. The method according to claim 4, further comprising detecting that the communication connection between the mobile terminal and the display device is ended, and
    removing, based on detecting that the communication connection between the mobile terminal and the display device is ended, the graphical representation of the mobile terminal from the display surface of the display device.

6. The method according to claim 4, further comprising determining whether the communication connection between the mobile terminal and the display device is active or inactive,
    wherein displaying a graphical representation of the mobile terminal in the first region on the display surface of the display device includes displaying a first graphical representation of the mobile terminal when it is determined that the communication connection between the mobile terminal and the display device is active and displaying a second graphical representation of the mobile terminal when it is determined that the communication connection between the mobile terminal and the display device is inactive.

7. The method according to claim 4, further comprising:
    receiving a user input corresponding to a command to change a size of the displayed first region, and
    updating, based on the received user input, the display of the graphical representation to change the size of the displayed first region.

8. The method according to claim 1, further comprising:
    detecting a touch location on a display surface of the display device at which a second mobile terminal touches the display device;
    designating, at an area of the display surface of the display device, a second region corresponding to the touch location of the second mobile terminal;
    determining that a second object displayed on the display surface of the display device is moved into the designated second region; and
    transmitting data, corresponding to the second object, to the second mobile terminal based on the determination that the second object is moved into the designated second region.

9. The method according to claim 8, further comprising:
    determining that the first and second regions at least partially overlap with each other;
    determining that a third object displayed on the display surface of the display device is moved into an area of overlap between the first region and the second region;
    transmitting data corresponding to the third object to the first and second mobile terminals based on the determination that the third object is moved into the area of overlap between the first region and the second region.

10. The method according to claim 1, wherein detecting the touch location on the display surface of the display device at which the mobile terminal touches the display device includes detecting the touch location on the display surface of the display device at which the mobile terminal physically contacts the display device.

11. The method according to claim 1, further comprising:
determining that a rear of the mobile terminal is touching the display device, wherein detecting touch location on a display surface of the display device at which the mobile terminal touches the display device includes detecting a location at which the rear of the mobile terminal touches the display device, the rear of the mobile terminal being the side of the mobile terminal opposite a display interface of the mobile terminal.

12. The method according to claim 1, further comprising:
determining that a front of the mobile terminal is touching the display device, the front of the mobile terminal being the side of the mobile terminal corresponding to a display interface of the mobile terminal, wherein detecting touch location on a display surface of the display device at which the mobile terminal touches the display device includes detecting a location at which the front of the mobile terminal touches the display device; and
receiving, by utilizing the designated first region, data from the mobile terminal.

13. The method according to claim 1, wherein detecting a touch location on a display surface of the display device at which the mobile terminal touches the display device includes determining the touch location on the display surface of the display device at which the mobile terminal touches the display device by using at least one of a touch sensor, an Near Field Communication (NFC) tag, or a catadioptric camera included in the display device.

14. A display device comprising:
a display unit configured to display a plurality of objects on a screen;
a control unit configured to:
  detect a touch location on a display surface of the display device at which a mobile terminal touches the display device;
  designate, at an area of the display surface of the display device, a first region corresponding to the touch location; and
  determine that an object displayed on the display surface of the display device is moved into the designated first region; and
a communication interface configured to establish a communication connection with the mobile terminal and transmit data, corresponding to the object, to the mobile terminal based on the determination that the object is moved into the designated first region,
wherein:
  the control unit being configured to detect a touch location on a display surface of the display device at which the mobile terminal touches the display device includes the control unit being configured to detect that the mobile terminal has touched a region of the display surface of the display device where no object is displayed, and
  the control unit being configured to designate, at an area of the display surface of the display device, a first region, corresponding to the touch location, includes the control unit being configured to designate, based on detecting that the mobile terminal touches a region of the display surface of the display device where no object is displayed, a first region, corresponding to the touch location, to the mobile terminal on the display surface of the display device, and not designate an area of the display surface as the first region corresponding to the touch location when detecting that the mobile terminal touches a region of the display surface of the display device where an object is displayed.

15. The display device according to claim 14, further comprising a storage unit configured to store a location of the designated first region and identification information of the mobile terminal in association with each other.

16. The display device according to claim 14, wherein the display unit is configured to display a graphical representation corresponding to the mobile terminal in the first region on the display surface of the display device.

17. The display device according to claim 16, wherein:
the communication interface is configured to detect that the communication connection between the mobile terminal and the display device is ended, and
the control unit is configured to remove, based on detecting that the communication connection between the mobile terminal and the display device is ended, the graphical representation of the mobile terminal from the display surface of the display device.

18. The display device according to claim 16, wherein:
the communication interface is configured to determine whether the communication connection between the mobile terminal and the display device is active or inactive; and
the display unit being configured to display a graphical representation of the mobile terminal in the first region on the display surface of the display device includes the display unit being configured to display a first graphical representation of the mobile terminal when it is determined that the communication connection between the mobile terminal and the display device is active and displaying a second graphical representation of the mobile terminal when it is determined that the communication connection between the mobile terminal and the display device is inactive.

19. A display device comprising:
a display unit configured to display a plurality of objects on a display surface;
a control unit configured to:
  detect a touch location on the display surface of the display device at which a mobile terminal touches the display device;
  designate, at an area of the display surface of the display device, a first region corresponding to the touch location; and
  determine that an object displayed on the display surface of the display device is moved into the designated first region; and
a communication interface configured to establish a communication connection with the mobile terminal and transmit data, corresponding to the object, to the mobile terminal based on the determination that the object is moved into the designated first region,
wherein the display unit is configured to display a graphical representation corresponding to the mobile terminal in the first region on the display surface of the display device,
wherein the communication interface is configured to determine whether the communication connection between the mobile terminal and the display device is active or inactive,
wherein the display unit being configured to display a graphical representation of the mobile terminal in the first region on the display surface of the display device includes the display unit being configured to display a first graphical representation of the mobile terminal when it is determined that the communication connection between the mobile terminal and the display device is active and displaying a second graphical representation of the mobile terminal when it is determined that the communication connection between the mobile terminal and the display device is inactive, and wherein the second graphical representation is different from the first graphical representation.

* * * * *